United States Patent [19]

Amini et al.

[11] Patent Number: 5,301,282
[45] Date of Patent: Apr. 5, 1994

[54] CONTROLLING BUS ALLOCATION USING ARBITRATION HOLD

[75] Inventors: Nader Amini; Bechara F. Boury; Terence J. Lohman, all of Boca Raton, Fla.

[73] Assignee: International Business Machines Corp., Armonk, N.Y.

[21] Appl. No.: 777,777

[22] Filed: Oct. 15, 1991

[51] Int. Cl.$^5$ .............................................. G06F 13/36
[52] U.S. Cl. ....................... 395/325; 370/85.2; 364/242.6; 364/242.92; 364/240; 364/DIG. 1
[58] Field of Search ................ 395/725, 325, 425; 340/825.5, 825.51; 370/85.2, 85.6, 350, 351, 2, 6, 8, 108, 144, 233, 239, 275, 674, 434

[56] References Cited

U.S. PATENT DOCUMENTS

| | | | |
|---|---|---|---|
| 4,237,534 | 12/1980 | Felix | 364/200 |
| 4,320,457 | 3/1982 | Tanikawa | 364/200 |
| 4,463,445 | 7/1984 | Grimes | 364/900 |
| 4,535,330 | 8/1985 | Carey et al. | 340/825.5 |
| 4,560,985 | 12/1985 | Strecker et al. | 340/825.5 |
| 4,611,297 | 9/1986 | Dudley et al. | 364/900 |
| 4,622,630 | 11/1986 | Vora et al. | 364/134 |
| 4,660,169 | 4/1987 | Norgren et al. | 395/325 |
| 4,719,569 | 1/1988 | Ludemann et al. | 364/200 |
| 4,729,090 | 3/1988 | Baba | 364/200 |
| 4,763,249 | 8/1988 | Bomba et al. | 395/325 |
| 4,807,109 | 2/1989 | Farrell et al. | 395/325 |
| 4,807,112 | 2/1989 | Hamasaki | 364/200 |
| 4,837,682 | 6/1989 | Culler | 364/200 |
| 4,908,749 | 3/1990 | Marshall et al. | 395/325 |
| 4,961,140 | 10/1990 | Pechanek et al. | 364/200 |
| 4,972,313 | 11/1990 | Getson, Jr. et al. | 395/325 |
| 4,977,494 | 12/1990 | Gabaldon et al. | 364/167.01 |
| 4,980,854 | 12/1990 | Donaldson et al. | 395/325 |
| 4,987,529 | 1/1991 | Craft et al. | 364/200 |
| 4,991,085 | 2/1991 | Pleva et al. | 395/275 |

FOREIGN PATENT DOCUMENTS

| | | | |
|---|---|---|---|
| 0341711 | 5/1989 | European Pat. Off. | G06F 13/36 |
| 0382469 | 2/1990 | European Pat. Off. | G06F 13/374 |
| 0378422 | 7/1990 | European Pat. Off. | G06F 13/28 |
| 4033854 | 4/1991 | Fed. Rep. of Germany | G06F 13/30 |

OTHER PUBLICATIONS

Patent Abstracts of Japan vol. 15, No. 044 (P-1161) Feb. 4, 1991 & JP-A-22 (NEC Corp) Nov. 14, 1990 G06F 13/36.

*Primary Examiner*—Gopal C. Ray
*Attorney, Agent, or Firm*—Robert S. Babayi

[57] ABSTRACT

An arbiter with an arbitration hold feature is provided which makes it possible to begin an arbitration cycle while information is still being transferred via a bus because the arbiter does not reallocate the bus until the present transfer is complete, as indicated by the arbitration hold feature. Accordingly, arbitration can essentially be overlapped with transfer of information over the bus, thus increasing the amount of information which can be transferred in a given interval of time.

26 Claims, 8 Drawing Sheets

CONTROLLING BUS ALLOCATION USING ARBITRATION HOLD

CROSS-REFERENCE TO RELATED APPLICATIONS

This application is related to the commonly-assigned application of Bechara F. Boury, Richard G. Hofmann and Terence J. Lohman titled "Selectable Refresh in an Information Handling System" U.S. patent application Ser. No. 07/777,778, the commonly-assigned application of Nader Amini, Bechara F. Boury and Terence J. Lohman titled "DMA Data Buffering Using a FIFO with Memory Backup" U.S. patent application Ser. No. 07/778,042, the commonly-assigned application of Nader Amini, Bechara F. Boury, Sherwood Brannon, Ian Concilio, Richard G. Hofmann and Terence J. Lohman titled "Dynamic Bus Sizing of DMA Transfers" U.S. patent application Ser. No. 07/776,924; the commonly-assigned application of Nader Amini, Bechara F. Boury, Sherwood Brannon and Terence J. Lohman titled "Expandable High Performance FIFO Design" U.S. patent application Ser. No. 07/778,298; the commonly-assigned application of Nader Amini, Bechara F. Boury, Sherwood Brannon, Richard G. Hofmann and Terence J. Lohman titled "Error Detection and Recovery in a DMA Controller" U.S. patent application Ser. No. 07/778,040; and, the commonly-assigned application of Bechara F. Boury, Terence J. Lohman and Long D. Nguyen titled "CPU Bus Allocation Control" U.S. patent application Ser. No. 07/778,041, became U.S. Pat. No. 5,239,631 on Aug. 24, 1993, all of which are filed on even date herewith and are hereby incorporated by reference.

BACKGROUND OF THE INVENTION

The present invention relates to information handling systems, and more particularly to arbitration in personal computer systems.

Generally in computer systems and especially in personal computer systems, data are transferred between various elements such as a central processing unit (CPU), memory devices and direct memory access (DMA) control circuitry as well as expansion devices such as input/output (I/O) adapters, bus controllers (i.e., elements which can control the computer system) and bus slaves (i.e., elements which are controlled by bus controllers). The expansion devices are often interconnected via a system I/O bus. The DMA control circuitry is used to transfer information to and from memory devices without using the CPU; generally, once the CPU has provided the DMA control circuitry with control information such as the source location from where information is to be moved, the destination address of where the data information should go, and the size of the data information to be moved, the DMA control circuitry controls the transfer of the data information.

It is known to provide the DMA control circuitry with a plurality of channels, each channel being capable of independent data transfers. An example of the use of plural DMA channels is when information which is stored on a hard disk is backed up. In this case, the information is received from the hard disk and is provided directly to a backup device via the DMA control circuitry. While this backup is occurring, other memory transfers may be conducted using the other DMA channels. Often, in order to provide plural DMA channels, it is necessary to provide respective buffer circuits via which data information is transferred.

Often in computer systems it is necessary for expansion devices to arbitrate for ownership of the I/O bus of the computer system; i.e., to decide which expansion device may transfer information via the I/O bus. For the purposes of arbitration the DMA controller is treated as if it is an expansion device such that the DMA controller must arbitrate with other expansion devices in order to win permission to transfer information via the I/O bus. It is known to provide an arbiter which determines which expansion device may transfer information via the I/O bus, i.e., which allocates the bus. Such an arbiter serves as a central arbitration control point via which all arbitration for the I/O bus occurs.

The I/O bus operates in time divided units which are called bus cycles. Bus cycles of the I/O bus are divided into arbitration cycles and grant cycles. During arbitration cycles, expansion devices compete for ownership of the I/O bus. During grant cycles, a device which has won ownership of the bus, transfers information. Normally, during arbitration cycles, information is not transferred via the bus. However, it is known to perform refresh operations, in which the memory of the system is refreshed, during arbitration cycles. Whenever ownership of the bus is given to another device, even if it is during an arbitration cycle such as with a refresh operation, the bus is reallocated.

One way of initiating an arbitration cycle is by an expansion device which desires to transfer information via the bus generating a preempt signal. When the preempt signal is received by the expansion device which currently owns the bus it causes the device to relinquish its control so that another arbitration cycle may occur.

SUMMARY OF THE INVENTION

It has been discovered that by providing an arbiter with an arbitration hold feature, it is possible to begin an arbitration cycle while information is still being transferred via a bus because the arbiter does not reallocate the bus until the present transfer is complete, as indicated by the arbitration hold feature. Accordingly, arbitration can essentially be overlapped with transfer of information over the bus, thus increasing the amount of information which can be transferred in a given interval of time.

DETAILED DESCRIPTION

Figure 1:
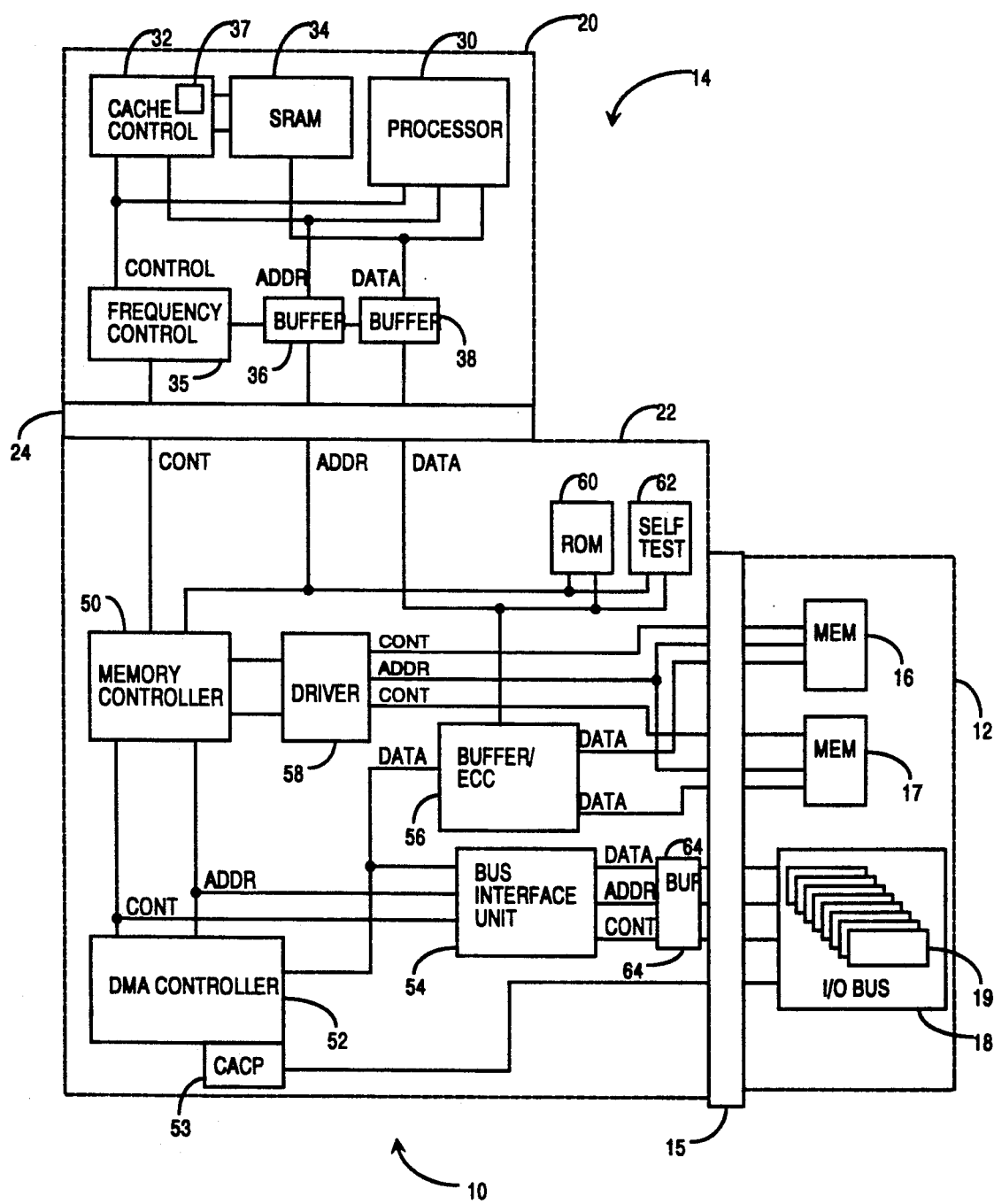
FIG. 1 is a schematic block diagram of a computer system which includes a central arbitration control point according to the present invention.

Referring to FIG. 1, computer system 10 includes system board (i.e., planar) 12 as well as processor complex 14. Processor complex 14 is connected to planar 12 via processor complex connector 15. Planar 12 includes memories 16,17 as well as input/output (I/O) bus 18, which may for example conform to the MICRO CHANNEL computer architecture. Memories 16, 17 are arranged as an interleaved system memory. Expansion devices 19 may be connected to computer 10 via I/O bus 18. Planar 12 may also include conventional video circuitry, timing circuitry, keyboard control circuitry and interrupt circuitry (all not shown) which are used by computer 10 during normal operation.

Processor complex 14 includes processor portion 20 and base portion 22. Processor portion 20 is connected to base portion 22 via local bus connector 24. Processor portion 20 operates at 50 MHz and base portion 22 operates at 40 MHz.

Processor portion 20 includes microprocessor 30 (e.g., available from Intel, Inc. under the trade designation 486), cache control module 32, memory 34 (e.g., static random access memory (SRAM)), and frequency control module 35 as well as address buffer 36 and data buffer 38. A data information path is provided between microprocessor 30, memory 34 and data buffer 38. An address information path is provided between microprocessor 30, cache control circuit 32 and address buffer 36. A control information path is provided between microprocessor 30, cache control module 32 and frequency control module 35. Additionally, an address information path and a control information path are provided between cache control module 32 and memory 34. The data, address and control information paths represent a processor bus.

Memory 34 provides a cache function by storing in short term memory information from either memories 16, 17 or from memory which is located on an expansion device 19. Cache control module 32 includes tag random access memory (RAM) 37 which stores the address of memories 16, 17 to which the information which is stored in memory 34 corresponds.

Frequency control module 35 synchronizes the 50 MHz processor portion with the 40 MHz base portion; frequency control module 35 also controls buffers 36, 38. Accordingly, frequency control module 35 determines when information is captured by buffers 36, 38 and when information that is stored in buffers 36, 38 is overwritten. Buffers 36, 38 are configured to allow two writes from memories 16, 17 to be stored in buffers 36, 38 simultaneously. Buffers 36, 38 are bidirectional, i.e., buffers 36, 38 can latch information which is provided by processor portion 20 and information which is provided to processor portion 20. Because buffers 36, 38 are bidirectional, processor portion 20 may be replaced or upgraded while maintaining a standard base portion 22.

Base portion 22 includes memory controller 50, direct memory access (DMA) controller 52, central arbitration control point (CACP) circuit 53, bus interface unit 54 and buffer/error correction code (ECC) circuit 56. Base portion 22 also includes driver circuit 58, read only memory (ROM) 60, self test circuit 62 and buffer circuit 64. A control information path is provided between memory controller 50 and frequency control module 35 of processor portion 20. Control information paths are also provided between: memory controller 50, DMA controller 52 and bus interface unit 54; memory controller 50 and driver 58; driver 58 and memories 16, 17; bus interface unit 54 and buffer 64; buffer 64 and I/O bus 18 of planar 12; and, CACP 53 and I/O bus 18 of planar 12. An address information path is provided between memory controller 50, ROM 60 and self test circuit 62 as well as address buffer 36 of processor portion 20. Address information paths are also provided between: memory controller 50, DMA controller 52 and bus interface unit 54; memory controller 50 and driver 58; driver 58 and memories 16, 17; bus interface unit 54 and buffer 64; and, buffer 64 and I/O bus 18 of planar 12. A data information path is provided between buffer/ECC circuit 56, ROM 60, and self test circuit 62 as well as data buffer 38 of processor portion 20. Data information paths are also provided between: buffer/ECC circuit 56, DMA controller 52 and bus interface unit 54; buffer/ECC circuit 56 and memory 16; buffer/ECC circuit 56 and memory 17; bus interface unit 54 and buffer 64; and, buffer 64 and I/O bus 18 of planar 12.

Memory controller 50 analyzes address information which is received from processor portion 20 to determine if this information corresponds to an address of memories 16, 17 or to an address of memory which is on an expansion device 19 (i.e., expansion memory). If the address information corresponds to an address of memories 16, 17, then memory controller 50 initiates a planar memory cycle to memories 16, 17. The address which is provided to memories 16, 17 during a planar memory cycle is based upon the address which is provided by processor portion 20; however, because memory controller 50, and memories 16, 17 know their location with reference to a much larger address spectrum, the address which is provided to memories 16, 17 need only be 10-bits wide compared to the 32-bit wide address which is provided by processor portion 20. While the planar memory cycle is occurring, memory controller 50 allows either DMA controller 52, or a bus master expansion device 19 to access information via I/O bus 18.

If the address information corresponds to an expansion memory address, then memory controller 50 initiates an expansion memory cycle with the expansion memory. During an expansion memory cycle, the address which is provided to memory controller 50 is provided via bus interface unit 54 to I/O bus 18. The expansion device which includes the memory to which the address corresponds receives the memory address from I/O bus 18. If the data is being retrieved from the expansion memory, the data information which is stored in the expansion memory is provided to processor portion 20 via I/O bus 18, buffer circuit 64, bus interface unit 54 buffer/ECC circuit 56 and driver circuit 58. If the data is being written to the expansion memory, the data information is provided to the expansion memory via bus interface unit 54 and I/O bus 18. Also, DMA controller 52 controls interchanging information between memories 16, 17 and memory which is on an expansion device 19.

DMA controller 52 provides three functions for processor complex 14. DMA controller 52 utilizes a small computer subsystem control block (SCB) architeture to configure DMA channels, thus avoiding the necessity of using programmed I/O to configure DMA channels.

DMA controller 52 also provides a buffering function to optimize transfers between slow expansion devices and fast memory devices. DMA controller 52 also provides an eight channel, 32-bit data, address and byte transfer count direct memory access function. When providing the DMA function, DMA controller 52 may function in two modes. In a first mode, DMA controller 52 functions in a programmed I/O mode in which DMA controller 52 is functionally an I/O slave. In a second mode, DMA controller 52 functions as a DMA bus master, in which DMA controller 52 arbitrates for and controls I/O bus 18. During this second mode, DMA controller 52 uses a first in, first out (FIFO) register circuit; data from a source is passed through the FIFO register circuit prior to being provided to a destination. Accordingly, a serial DMA operation is performed.

CACP 53 functions as the arbiter for computer system 10. CACP 53 receives arbitration control signals from DMA controller 52 as well as expansion devices 19 and controls, by providing arbitration control information, which device may transfer information via I/O bus 18 and for how long a particular device may control (i.e., own) I/O bus 18.

Bus interface unit 54 provides the bi-directional interface between the architecture of processor complex 14 and the architecture of I/O bus 18. Bus interface unit 54 also provides a buffering function to optimize the interface between the two architectures. Bus interface unit 54 also provides a bus sizing function. I.e., bus interface unit 54 can receive information in 32-bit wide segments and provide the information to I/O bus 18 in smaller segments depending on the requirements of the expansion device 19 with which processor complex 14 is communicating.

Buffer/ECC circuit 56 provides a data path between processor portion 20 and memories 16, 17, a data path between memories 16, 17 and DMA controller 52 and bus controller 54. Buffer/ECC circuit 56 also provides a data path between processor portion 20 and DMA controller 52 and bus interface circuit 54. Buffer/ECC circuit 56 checks for errors via error correction code; additionally, buffer/ECC circuit 56 is capable of operating with and supporting parity memory for downward compatibility with planars 12 which include parity memory.

Driver circuit 58 provides control information and address information from memory controller 50 to memories 16, 17. Driver circuit 58 drives this information based upon the number of single in-line memory modules (SIMMs) which are used to provide memories 16, 17. I.e., driver circuit 58 varies the signal intensity of the control and address information which is provided to memories 16, 17 based upon the size of memories 16, 17. The size of memories 16, 17 is determined by software during an initialization of computer 10.

Buffer circuit 64 provides isolation between base portion 22 and planar 12. Buffer circuit 64 uses buffers which allow buffer circuit 64 to capture boundary information between I/O bus 18 and bus interface unit 54 in real time; i.e., the buffers store the information as it appears at connector 15. Accordingly, if computer 10 experiences a failure condition, buffer circuit 64 may be accessed by a computer repair person to determine the information which was present at connector 15 upon failure of computer 10.

Self test circuit 62, which is connected to a plurality of locations within base portion 22, provides a plurality of self test features. Self test circuit 62 accesses buffer circuit 64 to determine if failure conditions exist. Self test circuit 62 also tests the other major components of base portion 22 upon power-on to determine whether computer 10 is ready for operation.

Figure 2:
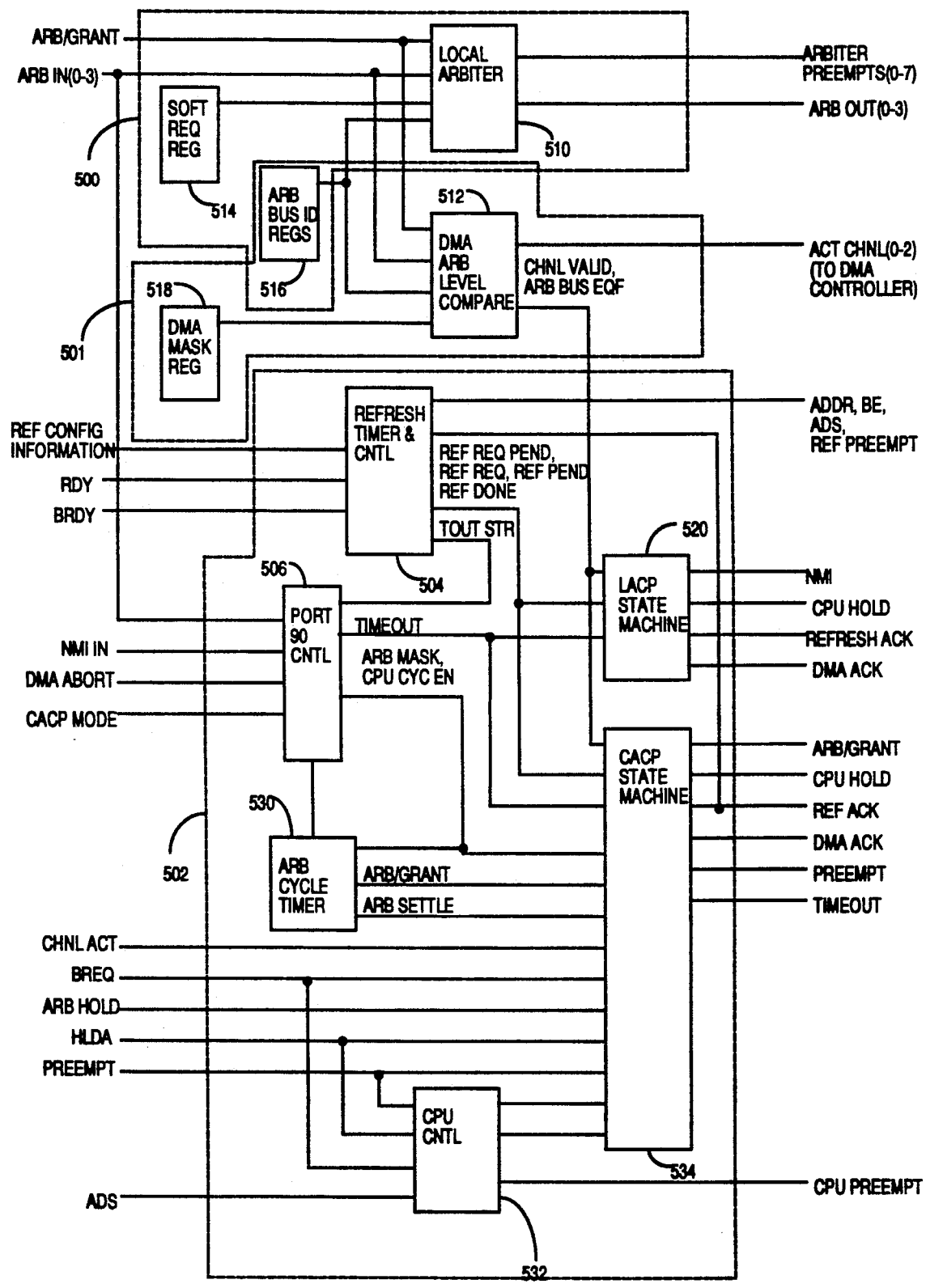
FIG. 2 is a schematic, block diagram of the central arbitration control point circuit of the computer system of FIG. 1.

Referring to FIG. 2, CACP circuit 53 includes soft request arbiter portion 500, DMA channel selection portion 501, and system control portion 502. Soft request arbiter portion 500 includes local arbiter circuit 510, soft request register 514 and arbitration bus identification register 516. DMA channel selection portion 501 includes DMA arbitration level compare circuit 512, DMA mask register 518 and shares arbitration bus identification register 516 with soft request arbiter portion 500. System control portion 502 includes refresh timer and control circuit 504, port 90 control circuit 506, local arbitration control point (LACP) state machine 520, central arbitration control point (CACP) state machine 534, arbitration cycle timer 530, and CPU arbitration control circuit 532.

Soft request arbiter portion 500 provides arbitration capabilities for DMA controller 52. In this way, respective channels of DMA controller 52 may arbitrate for control of I/O bus 18 along with any expansion devices 19 which are arbitrating for control of I/O bus 18. Thus local arbiter circuit 510 performs a function which is local, i.e., a function which is directly related to DMA controller 52. By using arbitration bus identification register 516, local arbiter circuit 510 can be programmed to arbitrate on any arbitration priority level; thus providing a virtual arbitration capability for DMA controller 52. DMA channel selection portion 501 provides the conversion from the virtual arbitration level appearing on the ARB IN(0-3) signals to a DMA channel number.

System control portion 502 can operate using either CACP state machine 534 or LACP state machine 520. When operating in a CACP mode, system control portion 502 controls the actual arbitration timing and access of all devices which are competing for access to I/O bus 18. In the CACP mode, system control portion 502 functions as the central controller of MICRO CHANNEL arbitration for computer system 10. When operating in a LACP mode, system control portion 502 allows DMA controller 52 to function under the control of a remote CACP. Using LACP mode allows multiple DMA controller 52 functions to exist on base portion 22 or I/O bus 18.

Refresh timer and control circuit 504 generates the timing and control information necessary to refresh any memory which is used in the computer system. More specifically, refresh timer and control circuit 504 generates a refresh request control signal (REF REQ) which is a refresh request pulse that is dependent upon the refresh requirements of the memory which is used in the computer system (e.g., every 15.6 microseconds for conventional dynamic random access memory). Upon generating the first refresh request control signal, refresh timer and control circuit 504 generates a refresh preempt signal (REF PREEMPT). The PREEMPT signals which are generated by various devices indicate that the device which currently has ownership of the bus has a preselected amount of time (e.g. 7.8 microseconds) to relinquish control of the bus so that another arbitration cycle can commence. The refresh operation is performed during the ensuing arbitration cycle. In addition to the REF PREEMPT signal, refresh timer and control circuit 504 generates and receives a plurality of refresh controls signals.

More specifically, refresh timer and control circuit 504 provides a refresh complete signal (REF DONE), which indicates that the refresh cycle or cycles are complete, a refresh request pending signal (REF REQ PEND), which indicates that refresh of memory has been requested or is pending, a refresh pending signal (REF PEND), which indicates that a refresh request is pending and a bus timeout strobe signal (TOUT STR), which indicates when three refresh requests have gone unserviced due to the current owner of I/O bus 18 ignoring the PREEMPT signal and not releasing the bus. The refresh control signals also include a 30 bit address signal (A(0–29)) and a four bit byte enable signals (BE(0–3)), which indicate which memory locations to refresh, an address strobe signal (ADS), which indicates when to sample the address signal and a refresh indication signal (REFRESH), which indicates that a refresh operation is being performed. Refresh timer and control circuit 504 also generates the I/O bus control signals MIO and R/W. Refresh timer and control circuit 504 receives refresh configuration information which is stored in a register during power on of computer system 10, a refresh acknowledge signal (REF ACK) signal, which is provided by CACP state machine 534 to indicate that it has granted refresh access to the bus and bus ready signals (RDY, BRDY) which indicate that a respective bus has completed its refresh cycles. The RDY signal is provided by bus interface unit 54 to indicate that I/O bus 18 has completed its refresh operation and the BRDY signal is provided by memory controller 50 to indicate that the local bus has completed its refresh operation.

Port 90 control circuit 506 stores arbitration control information which is written to CACP 53 so that this control information may be used by LACP state machine 520 and CACP state machine 534. Selection of either CACP state machine 520 or CACP state machine 534 is based upon the state of an arbitration mode signal (CACP MODE) which is set during power-up of the computer system. The arbitration control information is used in the overall control of CACP 53. The arbitration control information includes arbitration level information which indicates the arbitration level during the last grant of I/O bus 18. This arbitration level information indicates which device last had control of I/O bus 18 and thus can be used to determine which device caused an error condition if one should occur. The arbitration control information also includes CPU cycle during arbitration enable information which indicates whether the CPU, in addition to refresh, may access I/O bus 18 during the arbitration cycle time. Port 90 control circuit provides a CPU cycle enabled signal (CPU CYC EN) based upon the CPU cycle during arbitration enable information. The arbitration control information also includes mask arbitration information which forces I/O bus 18 to remain in the arbitration state. The mask arbitration information is used during power on or other times in which access to I/O bus 18 should be restricted to the CPU and to refresh. Port 90 control circuit provides an arbitration masked signal (ARB MASK) which indicates whether arbitration is masked or enabled. The arbitration control information also includes double arbitration cycle length information which indicates whether an arbitration cycle time may be lengthened.

Port 90 control circuit 506 receives error information from refresh timer and control circuit 504 and supervisory state machine 302. Port 90 control circuit 506 receives the TOUT SRB signal from refresh timer and control circuit 504. Port 90 control circuit also receives from DMA controller 52, a DMA execution abort (DMA ABORT) signal whenever an error is detected while DMA control state machine 120 is active. Upon receiving either an active TOUT STR or DMA ABORT signal, port 90 control circuit 506 generates an active bus timeout (TIMEOUT) signal. Additionally, when the TOUT STR signal or the DMA ABORT signal goes active, CACP state machine 534 immediately enters a masked arbitration state, which is indicated by an active masked arbitration signal (ARB MASK). An active ARB MASK signal causes CACP 53 to enter the arbitration state, which forces all expansion devices on I/O bus 18 to release the bus.

The TIMEOUT signal is received by LACP state machine 520, CACP state machine, and DMA controller 52. Upon receiving an active TIMEOUT signal: DMA control state machine completes the current bus cycle and gracefully returns control to arbitration state machine 300; CACP state machine passes the TIMEOUT signal to base portion 22 and processor portion 20 to alert the system that an error has occurred Alternately, LACP state machine 520 generates a Non Maskable Interrupt (NMI OUT) signal to alert CACP state machine 520, base 22 and processor 20 that an error has occurred.

Local arbiter circuit 510 is an 8-channel local arbiter which independently arbitrates for ownership of I/O bus 18 for the eight channels of DMA controller 52. Local arbiter circuit 510 receives a soft request signal from soft request register 514, which is an 8-bit register, one bit for each channel of DMA controller 52. The soft request signal indicates for which DMA channels local arbiter circuit 510 should initiate arbitration. Local arbiter circuit 510 also receives DMA channel arbitration identification signals from arbitration bus identification register circuit 526. Arbitration bus identification register circuit 526 includes eight 4-bit registers; each register holds a 4-bit arbitration identification signal (ARB ID) which corresponds to one of the eight channels of DMA controller 52. The arbitration identification signal is an arbitration level definition for the respective DMA channel. Accordingly, the different DMA channels may have different arbitration priorities. By providing local arbiter circuit 510 with a channel corresponding to each channel of DMA controller 52, it is possible for each channel of DMA controller 52 to arbitrate for ownership of I/O bus 18.

Based upon the soft request signal and the arbitration identification signals, local arbiter circuit 510 accesses I/O bus 18 and arbitrates for ownership of the bus along with any other devices which are requesting ownership of I/O bus 18. The arbitration is in accordance with conventional arbitration for a MICRO CHANNEL type I/O bus in which a four bit arbitration signal (ARB IN) indicates the arbitration level which receives ownership of the bus. Local arbiter circuit 510 is used to arbitrate for I/O bus 18 for memory to memory type DMA transfers or for DMA transfers which are to or from an I/O device which does not have a local arbiter. For transfers to or from an I/O device which does have a local arbiter, the I/O device arbitrates for ownership of the bus.

More than one DMA channel may have the same arbitration priority. If so, then DMA arbitration level compare circuit 512 is used to determine which channel may access the I/O bus first. DMA arbitration level compare circuit 512 first compares the ARB IN signal to the ARB ID signals for all eight channels to determine which channels have the same arbitration priority as the ARB IN signal. DMA arbitration level compare circuit 512 next compares the mask signals from DMA mask register 518 to the results of the comparison between the ARB IN signal and the ARB ID's. The mask signals indicate whether a respective DMA channel can be enabled. The eligible DMA channels are then prioritized by DMA arbitration level compare circuit 512; the channel which is granted access to the bus is identified by its respective active channel signal (ACT CHNL), which is provided to DMA controller 52. Additionally, DMA channel valid signal (CHNL VALID), which indicates that a DMA channel won arbitration for I/O bus 18, is provided to LACP state machine 520 and to CACP state machine 534. When the CHNL VALID signal is activated, CACP state machine 534 activates the DMA ACK signal. When the DMA ACK signal goes active, then DMA controller 52 looks to the ACT CHNL signal to determine which channel is enabled to execute a transfer. If a DMA channel does not win the bus, then when the GRANT signal goes active, the CHNL VALID signal remains inactive. DMA arbitration level compare circuit 512 also provides a CPU arbitration indication signal (ARB BUS EQF) which indicates that processor circuit 30 won ownership of I/O bus 18 during arbitration.

Arbitration cycle timer 530 of system control portion 502 receives the ARB/GRANT signal and generates an arbitration cycle signal (ARB SETTLE) which indicates how much time an arbitration cycle can take on the bus. Arbitration cycle timer 530 starts timing the arbitration cycle when the ARB/GRANT signal goes to the arbitration state. The ARB SETTLE signal is provided to CACP state machine 534.

CPU control circuit 532 of central arbitration portion 502 controls the access to I/O bus 18 of the central processor of computer system 10. CPU control circuit 532 receives a synchronized CPU hold acknowledge signal (HLDA), which indicates that the CPU acknowledges owning I/O bus 18, a bus request signal (BREQ), which indicates that the CPU wants to request ownership of I/O bus 18, the PREEMPT signal, and an address strobe signal (ADS), which indicates when the CPU is executing a cycle on I/O bus 18. CPU control circuit 532 also receives a hold signal (HOLD) and the ARB/GRANT signal from CACP state machine 534. CPU control circuit 532 also receives timer control signals such as an arbitration cycle complete indication signal (ARB DONE), a grant cycle complete indication signal (GNT DONE), a timer enable signal (CPU BURST EN), which enables the timers of CPU control circuit 532, a CPU idle check signal (CPU IDLE CHK), which indicates that the idle timer of CPU control circuit 532 may be checked, and a CPU cycle enable change indication signal (CHANGE CPU CYC EN), which indicates if the CPU CYC EN signal has changed as well as a run count signal (RCNT) and an idle count signal (ICNT). CPU control circuit 532 provides to I/O bus 18 a CPU preempt signal (CPU PREEMPT), which, as with the REF PREEMPT signal, requests that an arbitration cycle be initiated. CPU control circuit 532 also provides a CPU access timer signal (TIMER TUP), which indicates when the CPU's bus ownership time has expired as well as a processor burst signal (CPU BURST), which indicates that the CPU fairly arbitrated for I/O bus 18.

Figure 3:
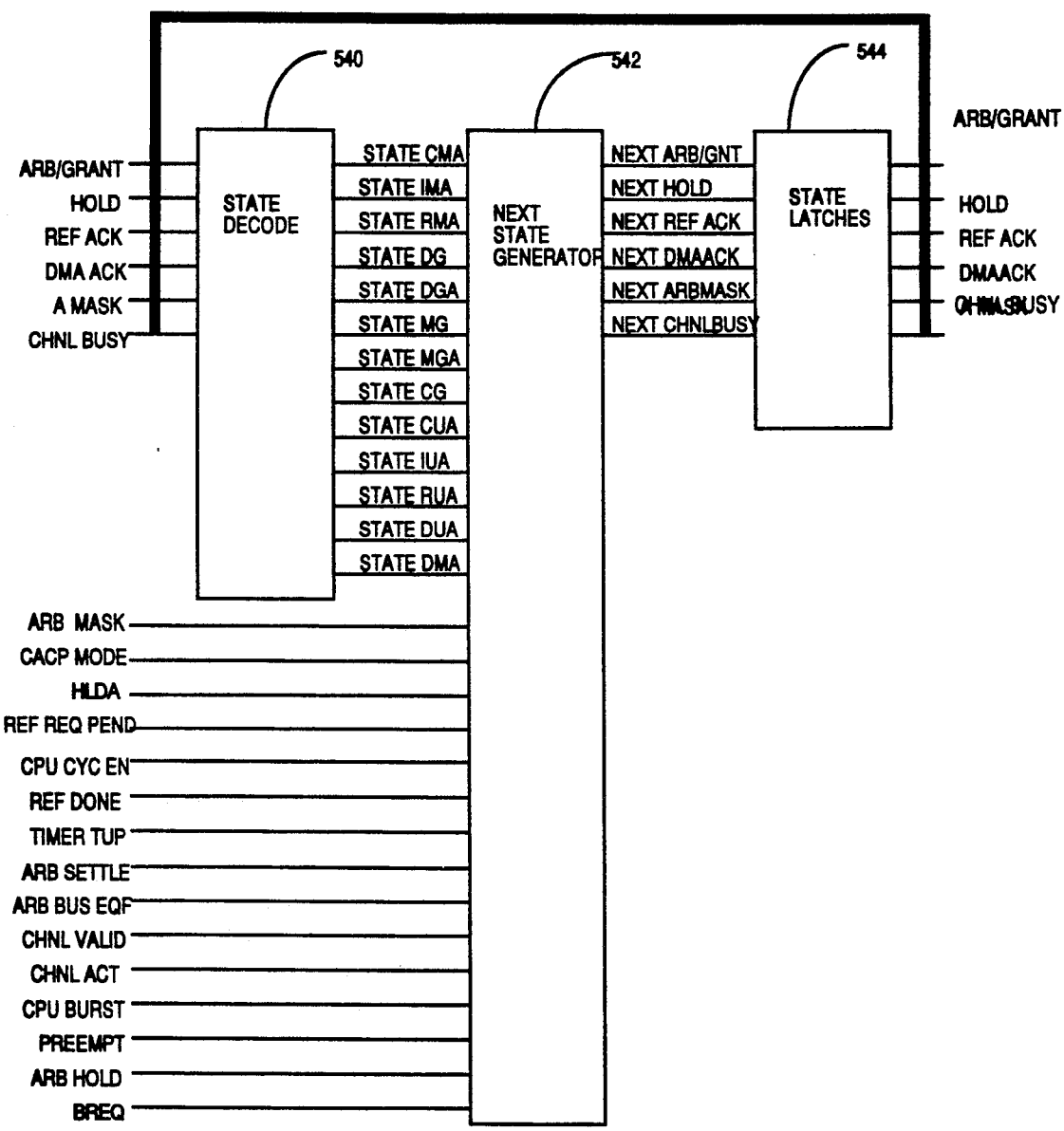
FIG. 3 is a schematic-block diagram of the CACP state machine of FIG. 2.

Referring to FIG. 3, CACP state machine 534 includes state decode circuit 540, next state generator circuit 542 and state latches 544. State decode circuit 540 receives the present ARB GRANT signal, the CPU HOLD signal, the REFRESH ACK signal, the DMA ACK signal, an arbitration masked during state (A MASK) signal, which identifies whether the present state is a masked arbitration state, and a channel busy (CHNL BUSY) signal, which indicates that I/O bus 18 is in use, from state latches 544 and provides state indication signals to next state generator circuit 542. The state indication signals indicate the present state of state machine 534. In addition to the state indication signals, next state generator circuit 542 also receives CACP control signals, CACP MODE, HLDA, REF REQ PEND, CPU CYC EN, REF DONE, TIMER TUP, ARB SETTLE, ARB BUS EQF, CHNL VALID. next state generator circuit also receives an I/O bus active signal (CHNL ACT), which indicates when I/O bus 18 is active, a synchronized arbitration hold signal (ARB HOLD), which requests the arbiter not to reallocate I/O bus 18, and the PREEMPT signal from I/O bus 18. The ARB HOLD signal is used either to force CACP state machine 534 into an idle state when the current controller device releases I/O bus 18 or to lock CACP state machine 534 in an idle state so that I/O bus 18 cannot be reallocated to a new controller device. Once CACP state machine 534 is in an idle state, there is no indication of which controller device previously owned I/O bus 18; if executing transfers on behalf of the controller device, the device which is setting the ARB HOLD signal active (e.g., bus interface unit 54) tracks which controller device owned the bus at the time the ARB HOLD signal was driven active. Next state generator circuit 542 provides the next ARB GRANT signal, CPU HOLD signal, REFRESH ACK signal, DMA ACK signal, A MASK signal and CHNL BUSY signal to state latches 544. State latches provide the next states of these signals as outputs when latched by the system CLOCK signal; i.e., the state of CACP state machine 534 is reevaluated every system clock cycle.

Figure 4:
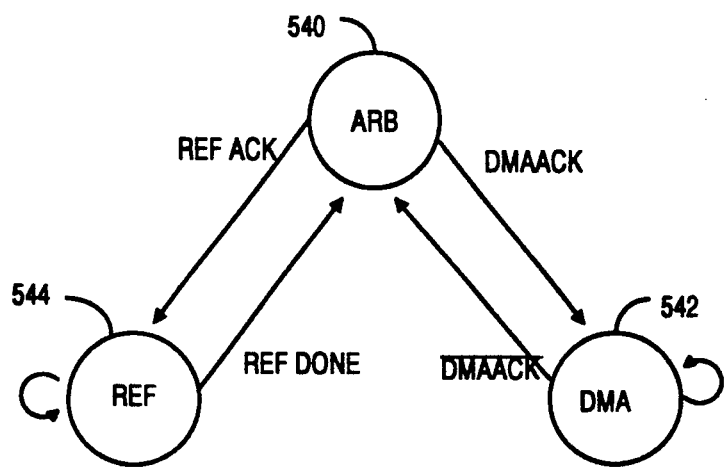
FIG. 4 is a state diagram of the overall operation of the FIG. 2 CACP circuit.

Referring to FIGS. 1, 2 and 4, in operation, CACP 53 performs the arbitration function under control of arbitration state machine 540. Arbitration control state machine 540 actually includes both CACP state machine 534 and LACP state machine 520. During operation of computer system 10, one of these state machines is selected based upon the state of the CACP MODE signal. However, the interaction between arbitration state machine 540 and DMA control state machine 542 and refresh control state machine 544 remains the same regardless of whether arbitration state machine 540 is functioning in the CACP mode or the LACP mode. If during arbitration, DMA controller 52 wins ownership of bus 18, then the DMA ACK signal is activated by CACP 53 and control shifts to DMA control state machine 542. DMA control state machine 542, which provides the control of DMA controller 52, performs DMA initialization functions as well as DMA transfer functions. After a transfer is complete, control is passed back to arbitration state machine 540, as indicated by an inactive DMA ACK signal and another arbitration cycle is initiated. If during arbitration, a refresh operation is to be performed, as indicated by an active REF ACK signal, then control is passed to refresh control state machine 544. After the refresh operation is complete, as indicated by an active REF DONE signal, then control is passed back to arbitration state machine 540.

Figure 5:
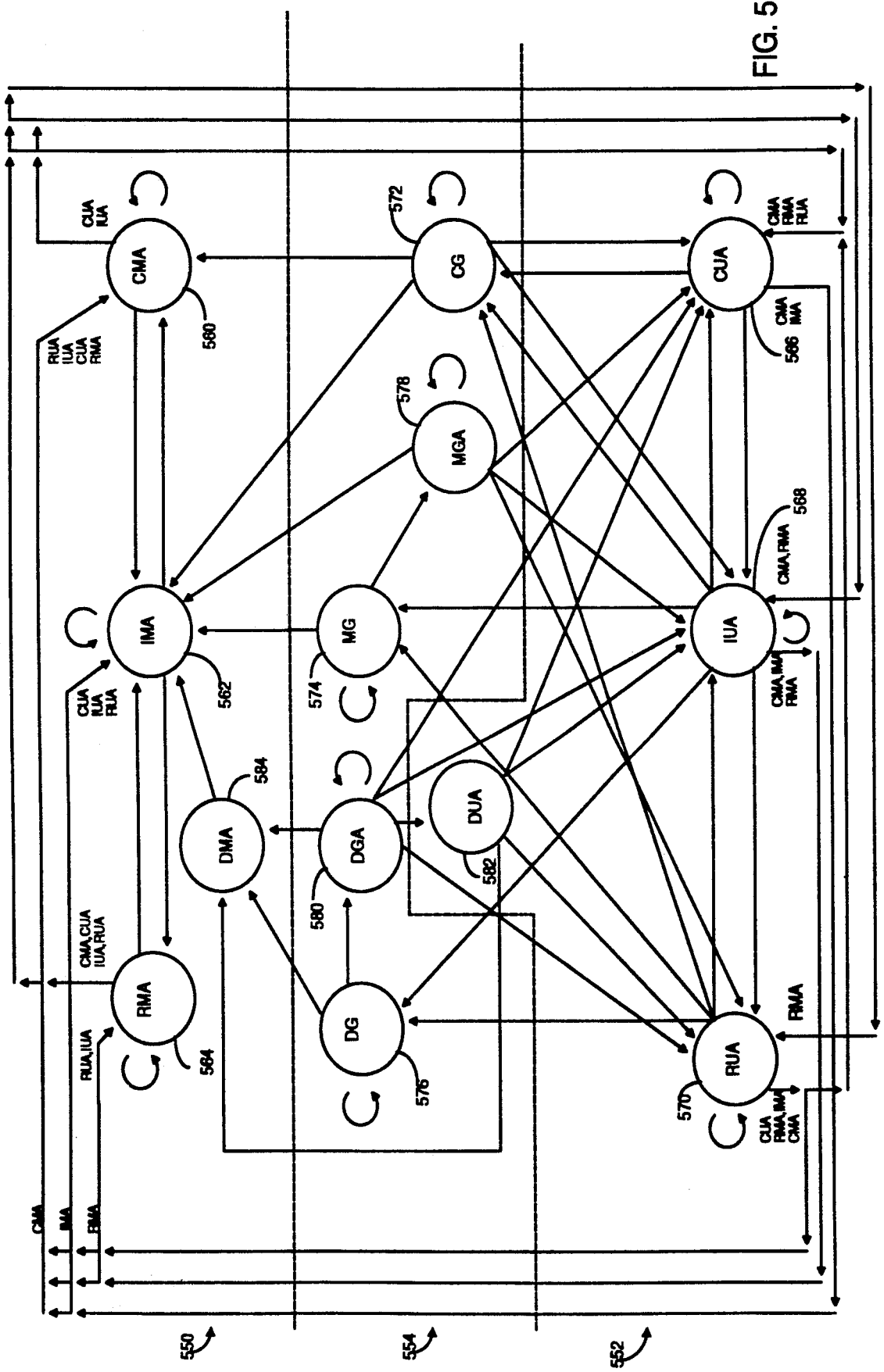
FIG. 5 is a state diagram of the operation of the CACP state machine of the FIG. 2 CACP circuit.

Referring to FIG. 5, CACP state machine 534 includes masked arbitration portion 550, unmasked arbitration portion 552 and grant portion 554. Arbitration control state machine uses CACP state machine 534 when, upon power-on, the CACP MODE signal is active; control remains with CACP state machine 534 unless the configuration of computer system 10 is changed. When computer system 10 is powered-on or reset, the ARB MASK signal, which is stored in port 90 control circuit 506, is activated; when CACP state machine receives an active ARB MASK signal, control remains in masked arbitration portion 550. When the ARB MASK signal is inactive, control of CACP state machine 534 shifts to unmasked arbitration portion 552. During normal operation of computer system 10, the ARB MASK signal is set inactive and control cycles between unmasked arbitration portion 552 and grant portion 554 based upon the state of the ARB/GRANT signal. I.e., when the ARB/GRANT signal is in the arbitration state, control is with unmasked arbitration portion 552; when the ARB/GRANT signal is in the grant state, control is with grant portion 554.

Operation of CACP state machine 534 starts in CPU masked arbitration (CMA) state 560. While in CMA state 560, the ARB/GRANT signal is in the arbitration state, the CPU HOLD signal is inactive, the REFRESH ACK signal is inactive, the DMA ACK is inactive and the A MASK signal is active. While in CMA state 560, next state generator circuit 542 monitors the CACP MODE signal, the ARB MASK signal, the synchronized HLDA signal, the REF REQ PEND signal and the CPU CYC EN signal to determine the next state of CACP state machine 534. The next state is also CMA state 560 if the CACP MODE signal is inactive. The next state is also CMA state 560 if the CACP signal is active, the ARB MASK signal is active, the synchronized HLDA signal is inactive and the REF REQ PEND signal is inactive. The next state is also CMA state 560 while the CACP MODE signal is active, the ARB MASK signal is active and the synchronized HLDA signal is active. The next state is idle masked arbitration state 562 when the CACP MODE signal is active, the ARB MASK signal is active, the synchronized HLDA signal is inactive and the REF REQ PRND signal is active.

While in IMA state 562, the ARB/GRANT signal is in the arbitration state, the CPU HOLD signal is active, the REFRESH ACK signal is inactive, the DMA ACK is inactive and the A MASK signal is active. While in IMA state 562, next state generator circuit 542 monitors the synchronized ARB HOLD signal, the REF REQ PEND signal and the synchronized HLDA signal to determine the next state of CACP state machine 534. The next state is also IMA state 562 if the synchronized ARB HOLD signal is inactive, the REF REQ PEND signal is inactive and the synchronized HLDA signal is inactive. The next state is also IMA state 562 if the synchronized ARB HOLD signal is inactive, the REF REQ PEND signal is inactive and the synchronized HLDA signal is inactive. The next state is also IMA state 562 if the synchronized ARB HOLD signal is active; this condition insures that CACP state machine 534 remains in an idle state and thus that CACP controller does not reallocate I/O bus 18 to a new controller device. The next state returns to CMA state 560 if the synchronized ARB HOLD signal is inactive, the REF REQ PEND signal is inactive and the synchronized HLDA signal is active. The next state is refresh masked arbitration (RMA) state 564 if the synchronized ARB HOLD signal is inactive, the REF REQ PEND signal is active and the synchronized HLDA signal is active.

While in RMA state 564, the ARB/GRANT signal is in the arbitration state, the CPU HOLD signal is active, the REFRESH ACK signal is active, the DMA ACK signal is inactive and the A MASK signal is active. During RMA state 564, next state generator circuit 542 monitors the ARB MASK signal, the REF DONE, the REF PEND signal, the CPU CYC EN signal and the synchronized ARB HOLD signal to determine the next state of CACP state machine 534. The next state is also RMA state 564 if the ARB MASK signal is active and the REF DONE signal is inactive. The next state returns to IMA state 562 if the ARB MASK signal is active, the REF DONE signal is active and the REF PEND signal is active. The next state is also IMA state 562 if the ARB MASK signal is active, the REF DONE signal is active the REF PEND signal is inactive and the synchronized ARB HOLD signal is active. The transition from RMA state 564 to IMA state 562 locks CACP state machine 534 in an idle state to allow a device to steal cycles between the end of a refresh function and the allocation of I/O bus 18 to another controller device; this transition also allows a second arbiter to lock a first arbiter in an idle state for systems which include more than one I/O bus and arbiter. The next state is CMA state 560 if the ARB MASK signal is active, the REF DONE signal is active the REF PEND signal is inactive and the synchronized ARB HOLD signal is inactive.

Control cycles between CMA state 560, IMA state 562 and RMA state 564 during initialization of the computer system. Because exiting CMA state 560 requires communication with the CPU, any transition between CMA state 560 and RMA state 564 passes though IMA state 562 to guarantee that the HOLD, HLDA handshake occurs between CACP 53 and processor 30 and thus that processor 30 has returned control of I/O bus 18 to CACP 53. However, control can directly shift from RMA state 564 to CMA state 560 because refresh is an internal arbitration function and there is no handshake requirement after the refresh of memory is complete. When control shifts from RMA state 564 to IMA state 562, another refresh is pending as indicated by the REF PEND signal.

After the initialization is complete, then the ARB MASK signal from port 90 register 506 is set inactive and control shifts from masked arbitration portion 550 to unmasked arbitration portion 552. More specifically, if control is with CMA state 560 and the CACP MODE signal is active, the ARB MASK signal is inactive, the synchronized HLDA signal is inactive, the REF REQ PEND signal is inactive and the CPU CYC EN signal is active, then the next state is CPU unmasked arbitration state (CUA) 566. Alternately, if, when the present state is CMA state 560, the CACP MODE signal is active, the ARB MASK signal is inactive and the synchronized HLDA signal is active, then the next state is also CUA state 566. If the present state is CMA state 560 and the CACP MODE signal is active, the ARB MASK signal is inactive, the synchronized HLDA signal is inactive, the REF REQ PEND signal is inactive and the CPU CYC EN signal is active, then the next state is idle unmasked arbitration (IUA) 568. If the present state is CMA state 560 and the CACP MODE signal is active, the ARB MASK signal is inactive, the synchronized HLDA signal is inactive and the REF REQ PEND signal is active, then the next state is also IUA state 568.

Because the purpose of the state is completed when exiting IMA state 562, the next state must be CMA state 560 prior to CUA state 566 or RMA state 564 prior to RUA state 570. However, because a refresh may be pending when exiting CMA state 560, the next state may be IUA state 568.

If the present state is RMA state 564 and the ARB MASK signal goes inactive and the REF DONE signal is inactive then the next state is refresh unmasked arbitration (RUA) state 570. If the present state is RMA state 564 and the ARB MASK signal goes inactive, the REF DONE signal is active, the REF PEND signal is inactive and the CPU CYC EN signal is inactive, then the next state is IUA state 568. If the present state is RMA state 564 and the ARB MASK signal is inactive, the REF DONE signal is active and the REF PEND signal is active, then the next state is IUA state 568. If the present state is RMA state 564 and the ARB MASK signal is inactive, the REF DONE signal is active, the REF PEND signal is inactive, the CPU CYC EN signal is active and the synchronized ARB HOLD signal is active, then the next state is IUA state 568. The transition from RMA state 564 to IUA state 568 locks CACP state machine 534 in an idle state to allow a device to steal cycles between the end of a refresh function and the allocation of I/O bus 18 to another controller device; this transition also allows a second arbiter to lock a first arbiter in an idle state for systems which include more than one I/O bus and arbiter. If the present state is RMA state 564 and the ARB MASK signal is inactive, the REF DONE signal is active, the REF PEND signal is inactive, the CPU CYC EN signal is active and the synchronized ARB HOLD signal is inactive, then the next state is CUA state 568.

While in CUA state 566, the ARB/GRANT signal is in the arbitration state, the CPU HOLD signal is inactive, the REFRESH ACK signal is inactive, the DMA ACK signal is inactive and the ARB MASK signal is inactive. During CUA state 566, next state generator circuit 542 monitors the ARB MASK signal, the synchronized HLDA signal, the REF REQ PEND signal, the TIMER TUP signal, the ARB SETTLE signal the ARB BUS EQF signal and the synchronized BREQ signal to determine the next state of CACP state machine 534. When CUA state 566 is the present state and the ARB MASK signal is inactive, the synchronized HLDA signal is inactive, the REF REQ PEND signal is inactive, the TIMER TUP signal is inactive and the ARB SETTLE signal is inactive, then the next state is also CUA state 566. Also, when CUA state 566 is the present state and the ARB MASK signal is inactive, the synchronized HLDA signal is inactive, the REF REQ PEND signal is inactive, the TIMER TUP signal is inactive and the ARB SETTLE signal is active and the ARB BUS EQF signal is inactive, then the next state is also CUA state 566. Also, when CUA state 566 is the present state, and the ARB MASK signal is inactive and the synchronized HLDA signal is active, then the next state is also CUA state 566. Also, when CUA state 566 is the present state and the ARB MASK signal is inactive, the synchronized HLDA signal is inactive, the REF REQ PEND signal is inactive, the TIMER TUP signal is active, the ARB SETTLE signal is inactive and the synchronized BREQ signal is active, then the next state is also CUA state 566. When CUA state 566 is the present state and the ARB MASK signal is inactive, the synchronized HLDA signal is inactive, the REF REQ PEND signal is inactive, the TIMER TUP signal is active, the ARB SETTLE signal is active and the ARB BUS EQF signal is active, then the next state is IUA state 568. Additionally, when CUA state 566 is the present state and the ARB MASK signal is inactive, the synchronized HLDA signal is inactive and the REF REQ PEND signal is active, then the next state is IUA state 562. Also, when CUA state 566 is the present state and the ARB MASK signal is inactive, the synchronized HLDA signal is inactive, the REF REQ PEND signal is inactive, the TIMER TUP signal is active, the ARB SETTLE signal is inactive and the synchronized BREQ signal is inactive, then the next state is also IUA state 568.

While in IUA state 568, the ARB/GRANT signal is in the arbitration state, the CPU HOLD signal in active, the REFRESH ACK signal is inactive, the DMA ACK signal is inactive and the ARB MASK signal is inactive. During IUA state 568, next state generator circuit 542 monitors the ARB MASK signal, the synchronized HLDA signal, the REF REQ PEND signal, the CPU CYC EN signal, the TIMER TUP signal, the ARB SETTLE signal, the ARB BUS EQF signal, the CHNL VALID signal, the synchronized BREQ signal and the synchronized ARB HOLD signal. When IUA state 568 is the present state and the ARB MASK signal is inactive, the synchronized HLDA signal is inactive and the synchronized ARB HOLD signal is invalid, then the next state is also IUA state 568. When IUA state 568 is the present state and the ARB MASK signal is inactive, the synchronized HLDA signal is active, the REF REQ PEND signal is inactive, the CPU CYC EN signal is inactive, the ARB SETTLE signal is inactive and the synchronized ARB HOLD signal is inactive, then the next state is also IUA state 568. When IUA state 568 is the present state and the ARB MASK signal is inactive and the synchronized ARB HOLD signal is active, then the next state is also IUA state 568; this signal combination allows whichever device controls I/O bus 18 to complete a transfer while CACP 53 initiates another arbitration cycle. The transition from IUA state 568 to IUA state 568 insures that CACP state machine 534 remains in an idle state and thus that CACP controller does not reallocate I/O bus 18 to a new controller device. When IUA state 568 is the present state and the ARB MASK signal is inactive, the synchronized HLDA signal is active, the REF REQ PEND signal is inactive, the CPU CYC EN signal is active, the TIMER TUP signal is active, the ARB SETTLE signal is inactive, the synchronized ARB HOLD signal is inactive and the synchronized BREQ signal is inactive, then the next state is IUA state 566.

Alternately, when IUA state 568 is the present state and the ARB MASK signal is inactive, the synchronized HLDA signal is active, the REF REQ PEND signal is inactive, the CPU CYC EN signal is active, the TIMER TUP signal is inactive, the ARB SETTLE signal is inactive and the ARB MASK signal is inactive, then the next state is CUA state 566. When IUA state 568 is the present state and the ARB MASK signal is inactive, the synchronized HLDA signal is active, the REF REQ PEND signal is inactive, the CPU CYC EN signal is active, the TIMER TUP signal is inactive, the ARB SETTLE signal is active, the ARB BUS EQF signal is inactive and the ARB MASK signal is inactive, then the next state is CUA state 566. When IUA state 568 is the present state and the ARB MASK signal is inactive, the synchronized HLDA signal is active, the REF REQ PEND signal is inactive, the CPU CYC EN signal is active, the TIMER TUP signal is active, the ARB SETTLE signal is inactive, the synchronized ARB HOLD signal is inactive and the synchronized BREQ signal is active, then the next state is CUA state 566.

When IUA state 568 is the present state and the ARB MASK signal is inactive, the synchronized HLDA signal is active, the REF REQ PEND signal is active and the ARB MASK signal is inactive, then the next state is RUA state 570.

While in RUA state 570, the ARB/GRANT signal is in the arbitration state, the CPU HOLD signal is active, the REFRESH ACK signal is active, the DMA ACK signal is inactive and the ARB MASK signal is inactive. During RUA state 570, next state generator circuit 442 monitors the ARB MASK signal, the REF DONE signal, the REF PEND signal, the CPU CYC EN signal, the TIMER TUP signal, the ARB SETTLE signal, the ARB BUS EQF signal, the CHNL VALID signal and the synchronized ARB HOLD signal to determine the next state of CACP state machine 534. When RUA state 570 is the present state and the ARB MASK signal is inactive and the REF DONE signal is inactive, then the next state is also RUA state 570.

Alternately, when RUA state 570 is the present state and the ARB MASK signal is inactive, the REF DONE signal is active, the REF PEND signal is inactive, the CPU CYC EN signal is inactive and the ARB SETTLE signal is inactive, then the next state is IUA state 568. When RUA state 570 is the present state and the ARB MASK signal is inactive, the REF DONE signal is active, the REF PEND signal is inactive, the CPU CYC EN signal is inactive, the ARB SETTLE signal is active, the ARB BUS EQF signal is inactive, the CHNL VALID signal is inactive and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is inactive, the ARB SETTLE signal is active, the ARB BUS EQF signal is inactive, the CHNL VALID signal is active and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is inactive, the ARB SETTLE signal is active, the ARB BUS EQF signal is active and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is active, the TIMER TUP signal is inactive, the ARB SETTLE signal is inactive and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is active, the TIMER TUP signal is inactive, the ARB SETTLE signal is active, the ARB BUS EQF signal is inactive and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is active, the TIMER TUP signal is inactive, the ARB SETTLE signal is active, the ARB BUS EQF signal is active and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is active, the TIMER TUP signal is active and the ARB SETTLE signal is inactive, then the next state is IUA state 568. When RUA state 570 is the present state and the ARB MASK signal is inactive, the REF DONE signal is active, the REF PEND signal is inactive, the CPU CYC EN signal is active, the TIMER TUP signal is active, the ARB SETTLE signal is active, the ARB BUS EQF signal is inactive, the CHNL VALID signal is inactive and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is active, the TIMER TUP signal is active, the ARB SETTLE signal is active, the ARB BUS EQF signal is inactive, the CHNL VALID signal is active and the synchronized ARB HOLD signal is active, then the next state is IUA state 568. When RUA state 570 is the present state and the ARB MASK signal is inactive, the REF DONE signal is active, the REF PEND signal is inactive, the CPU CYC EN signal is active, the TIMER TUP signal is active, the ARB SETTLE signal is active, the ARB BUS EQF signal is active and the synchronized ARB HOLD signal is active, then the next state is IUA state 568. Finally, when the ARB MASK signal is active, the REF DONE signal is active and the REF PEND signal is active, then the next state is IUA state 568. The transition from RUA state 570 to IUA state 568 locks CACP state machine 534 in an idle state to allow a device to steal cycles between the end of a refresh function and the allocation of I/O bus 18 to another controller device; this transition also allows a second arbiter to lock a first arbiter in an idle state for systems which include more than one I/O bus and arbiter.

When RUA state 570 is the present state and ARB MASK signal is inactive, the REF DONE signal is active, the REF PEND signal is inactive, the CPU CYC EN signal is active, the TIMER TUP signal is inactive, the ARB SETTLE signal is inactive and the synchronized ARB HOLD signal is inactive, then the next state is CUA state 566. When RUA state 570 is the present state and ARB MASK signal is inactive, the REF DONE signal is active, the REF PEND signal is inactive, the CPU CYC EN signal is active, the TIMER TUP signal is inactive, the ARB SETTLE signal is active, the ARB BUS EQF signal is inactive and the synchronized ARB HOLD signal is inactive, then the next state is CUA state 566.

Control cycles between CUA state 560, IUA state 562 and RUA state 564 while the ARB/GRANT signal remains in the arbitration state. Because exiting CUA state 560 requires communication with the CPU, any transition between CUA state 560 and RUA state 564 passes though IUA state 562 to allow the HOLD signal, HLDA signal handshake and thus to guarantee that the CPU has relinquished control of I/O bus 18. However, control can shift from RUA state 564 to CUA state 560 because refresh is an internal function and there is no handshake requirement after the refresh of memory is complete. Control shifts from RUA state 564 to IUA state 562 because there is another refresh request pending as indicated by the REFRESH PEND signal.

When CUA state 566 is the present state and the ARB MASK signal is inactive, the synchronized HLDA signal is inactive, the REF REQ PEND signal is inactive, the TIMER TUP signal is inactive, the ARB SETTLE signal is active and the ARB BUS EQF signal is active, then the next state is the grant state, CPU grant (CG) state 572. Additionally, when CUA state 566 is the present state and the ARB MASK signal is inactive, the synchronized HLDA signal is inactive, the REF REQ PEND signal is inactive, the TIMER TUP signal is active, the ARB SETTLE signal is active and the ARB BUS EQF signal is active, then the next state is also CG state 572.

While in CG state 572, the ARB/GRANT signal is in the grant state, the CPU HOLD signal is inactive, the REFRESH ACK signal is inactive, the DMA ACK signal is inactive and the ARB MASK signal is inactive. During CG state 572, next state generator circuit 542 monitors the ARB MASK signal, the synchronized HLDA signal, the CPU BURST signal, the TIMER TUP signal, the synchronized PREEMPT signal, the REF REQ PEND signal and the CPU CYC EN signal. When CG state 572 is the present state and the ARB MASK signal is inactive, the synchronized HLDA signal is inactive, the CPU BURST signal is inactive and the synchronized PREEMPT signal is inactive, then the next state is also CG state 572. Additionally, when the present state is CG state 572, and the ARB MASK signal is inactive, the synchronized HLDA signal is inactive, the CPU BURST signal is active and the TIMER TUP signal is inactive, then the next state is also CG state 572. When CG state 572 is the present state and the ARB MASK signal is inactive, the synchronized HLDA signal is inactive, the CPU BURST signal is active, the TIMER TUP signal is active and the synchronized PREEMPT signal is inactive, then the next state is also CG state 572. When CG state 572 is the present state and the ARB MASK signal is inactive and the synchronized HLDA signal is active, then the next state is also CG state 572.

When CG state 572 is the present state and the ARB MASK signal is inactive, the synchronized HLDA signal is inactive, the CPU BURST signal is inactive, the synchronized PREEMPT signal is inactive, the REF REQ PEND signal is inactive and the CPU CYC EN signal is active, then the next state is CUA state 566. When CG state 572 is the present state and the ARB MASK signal is inactive, the synchronized HLDA signal is inactive, the CPU BURST signal is active, the TIMER TUP signal is active, the synchronized PREEMPT signal is active, the REF REQ PEND signal is inactive and the CPU CYC EN signal is active, then the next state is CUA state 566.

When CG state 572 is the present state and the ARB MASK signal is inactive, the synchronized HLDA signal is inactive, the CPU BURST signal is inactive, the synchronized PREEMPT signal is active, the REF REQ PEND signal is inactive and the CPU CYC EN signal is inactive, then the next state is IUA state 568. When CG state 572 is the present state and the ARB MASK signal is inactive, the synchronized HLDA signal is inactive, the CPU BURST signal is inactive, the synchronized PREEMPT signal is active and the REF REQ PEND signal is active, then the next state is IUA state 568. When CG state 572 is the present state and the ARB MASK signal is inactive, the synchronized HLDA signal is inactive, the CPU BURST signal is active, the TIMER TUP signal is active, the synchronized PREEMPT signal is active, the REF REQ PEND signal is inactive and the CPU CYC EN signal is inactive, then the next state is IUA state 568. When CG state 572 is the present state and the ARB MASK signal is inactive, the synchronized HLDA signal is inactive, the CPU BURST signal is active, the TIMER TUP signal is active, the synchronized PREEMPT signal is active and the REF REQ PEND signal is active, then the next state is IUA state 568.

When IUA state 568 is the present state and the ARB MASK signal is inactive, the synchronized HLDA signal is active, the REF REQ PEND signal is inactive, the CPU CYC EN signal is active, the ARB SETTLE signal is active, the ARB BUS EQF signal is active and the synchronized ARB HOLD signal is inactive, then the next state is CG state 572. Additionally, when IUA state 568 is the present state and the ARB MASK signal is inactive, the synchronized HLDA signal is active, the REF REQ PEND signal is inactive, the CPU CYC EN signal is active, the TIMER TUP signal is inactive, the ARB SETTLE signal is active, the ARB BUS EQF signal is active, the CHNL VALID signal is active and the synchronized ARB HOLD signal is inactive, then the next state is CG state 572. Additionally, when IUA state 568 is the present state and the ARB MASK signal is inactive, the synchronized HLDA signal is active, the REF REQ PEND signal is inactive, the CPU CYC EN signal is active, the TIMER TUP signal is active, the ARB SETTLE signal is active, the ARB BUS EQF signal is active and the synchronized ARB HOLD signal is inactive, then the next state is CG state 572.

When IUA state 568 is the present state and the ARB MASK signal is inactive, the synchronized HLDA signal is active, the REF REQ PEND signal is inactive, the CPU CYC EN signal is active, the TIMER TUP signal is active, the ARB SETTLE signal is active, the ARB BUS EQF signal is active and the synchronized ARB HOLD signal is inactive, then the next state is external master grant (MG) state 574. During MG state 574 the ARB/GRANT signal is in the grant state, the CPU HOLD signal is active, the REFRESH ACK signal is inactive, the DMA ACK signal is inactive and the CHNLBUSY signal is inactive. While in MG state 574, next state generator circuit 542 monitors the ARB MASK signal and the synchronized CHNL ACT signal. When MG state 574 is the present state and the ARB MASK signal is inactive and the synchronized CHNL ACT signal is inactive then the next state is MG state 574. When MG state 574 is the present state and the ARB MASK signal is inactive and the synchronized CHNL ACT signal is active then the next state is external master grant active (MGA) state 578.

While in MGA state 578, the ARB/GRANT signal is in the grant state, the CPU HOLD signal is active, the REFRESH ACK signal in inactive, the DMA ACK signal is inactive and the CHNLBUSY signal is active. During MGA state 578, next state generator circuit 542 monitors the ARB MASK signal, the synchronized CHNL ACT signal, the REF REQ PEND signal, the CPU CYC EN signal and the synchronized ARB HOLD signal. When MGA state 578 is the present state and the ARB MASK signal is inactive and the synchronized CHNL ACT signal is active, then the next state is also MGA state 578.

When MGA state 578 is the present state and the ARB MASK signal is inactive, the synchronized CHNL ACT signal is inactive, the REF REQ PEND signal is inactive, the CPU CYC EN signal is active and the synchronized ARB HOLD signal is inactive, the next state is CUA state 566. When MGA state 578 is the present state and the ARB MASK signal is inactive, the synchronized CHNL ACT signal is inactive, the REF REQ PEND signal is active and the synchronized ARB HOLD signal is inactive, the next state is RUA state 570.

When MGA state 578 is the present state and the ARB MASK signal is inactive, the synchronized CHNL ACT signal is inactive, the REF REQ PEND signal is inactive and the CPU CYC EN signal is inactive, then the next state is IUA state 568. When MGA state 578 is the present state and the ARB MASK signal is inactive, the synchronized CHNL ACT signal is inactive, the REF REQ PEND signal is inactive, the CPU CYC EN signal is active and the synchronized ARB HOLD signal is active, the next state is IUA state 568. When MGA state 578 is the present state and the ARB MASK signal is inactive, the synchronized CHNL ACT signal is inactive, the REF REQ PEND signal is active, and the synchronized ARB HOLD signal is active, the next state is IUA state 568. The transition from MGA state 578 to IUA state 568 indicates that a controller device on I/O bus 18 has completed its portion of a transfer; this transition forces CACP state machine 534 to remain in an idle state so that arbitration can be locked, thus allowing a local device such as bus interface unit 54 to complete the local transfer cycles from the previous controller device while allowing arbitration to occur in parallel.

When IUA state 568 is the present state and the ARB MASk signal is inactive, the synchronized HLDA signal is active, the REF REQ PEND signal is inactive, the CPU CYC EN signal is inactive, the ARB SETTLE signal is active, the ARB BUS EQF signal is inactive, the CHNL VALID signal is active and the synchronized ARB HOLD signal is inactive, then the next state is internal DMA grant, not active (DG) state 576. When IUA state 568 is the present state and the ARB MASK signal is inactive, the synchronized HLDA signal is active, the REF REQ PEND signal is inactive, the CPU CYC EN signal is active, the TIMER TUP signal is active, the ARB SETTLE signal is active, the ARB BUS EQF signal is inactive, the CHNL VALID signal is active and the synchronized ARB HOLD signal is inactive, then the next state is also DG state 576.

While in DG state 576, the ARB/GRANT signal is in the grant state, the CPU HOLD signal is inactive, the REFRESH ACK signal is inactive, the DMA ACK signal is active and the CHNLBUSY signal is inactive. During DG state 576, next state generator circuit 542 monitors the ARB MASK signal and the synchronized CHNL ACT signal. When DG state 576 is the present state and the ARB MASK signal is inactive and the synchronized CHNL ACT signal is inactive, DG state 576 is also the next state.

When DG state 576 is the present state and the ARB MASK signal is inactive and the synchronized CHNL ACT signal is active, the next state is internal DMA grant active (DGA) state 580. While in DGA state 580, the ARB/GRANT signal is in the grant state, the CPU HOLD signal is active, the REFRESH ACK signal is inactive, the DMA ACK signal is active and the CHNLBUSY signal is active. During DGA state 580, next state generator circuit 542 monitors the ARB MASK signal, the synchronized CHNL ACT signal, the REF REQ PEND signal, the CPU CYC EN signal and the synchronized ARB HOLD signal. When DGA state 580 is the present state and the ARB MASK signal is inactive and the synchronized CHNL ACT signal is active, then the next state is also DGA state 580. When DGA state 580 is the present state and the ARB MASK signal is inactive, the synchronized CHNL ACT signal is inactive, the REF REQ PEND signal is inactive, the CPU CYC EN signal is inactive and the synchronized ARB HOLD signal is inactive, the next state is IUA state 568. When DGA state 580 is the present state and the ARB MASK signal is inactive, the synchronized CHNL ACT signal is inactive, the REF REQ PEND signal is inactive, the CPU CYC EN signal is active and the synchronized ARB HOLD signal is inactive, the next state is CUA state 566. When DGA state 580 is the present state and the ARB MASK signal is inactive, the synchronized CHNL ACT signal is inactive, the REF REQ PEND signal is active and the synchronized ARB HOLD signal is inactive, the next state is RUA state 570.

When DGA state 580 is the present state and the ARB MASK signal is inactive, the synchronized CHNL ACT signal is inactive, the REF REQ PEND signal is inactive, the CPU CYC EN signal is inactive and the synchronized ARB HOLD signal is active, the next state is DMA unmasked arbitration (DUA) state 582. When DGA state 580 is the present state and the ARB MASK signal is inactive, the synchronized CHNL ACT signal is inactive, the REF REQ PEND signal is inactive, the CPU CYC EN signal is active and the synchronized ARB HOLD signal is active, the next state is DUA state 582. When DGA state 580 is the present state and the ARB MASK signal is inactive, the synchronized CHNL ACT signal is inactive, the REF REQ PEND signal is active and the synchronized ARB HOLD signal is active, the next state is DUA state 582. The transition from DGA state 580 to DUA state 582 indicates that DMA controller 52 has completed reading information from either memory or a DMA slave expansion device, but that DMA controller 52 still has data in it which must be written to memory. The DUA state allows DMA controller 52 to remain active while allowing CACP 53 to initiate in parallel another arbitration cycle. Upon entering DUA state 582, arbitration is locked until the ARB HOLD signal goes inactive, to insure that CACP 53 does not reallocate I/O bus 18.

While in DUA state 582, the ARB/GRANT signal is in the grant state, the CPU HOLD signal is active, the REFRESH ACK signal is inactive, the DMA ACK signal is active and the ARB MASK signal is inactive. During DUA state 582, next state generator circuit 542 monitors the ARB MASK signal, the synchronized ARB HOLD signal, the REF REQ PEND signal and the CPU CYC EN signal. When DUA state 582 is the present state and the ARB MASK signal is inactive and the synchronized ARB HOLD signal is active, then the next state is also DUA state 582. The transition from DUA state 582 to DUA state 582 indicates that DMA controller 52 is currently flushing the data information which is stored in it; this transition insures that CACP 53 does not reallocate I/O bus 18 while DMA controller 52 is active however, CACP 53 may be arbitrating for the next grant cycle. When DUA state 582 is the present state and the ARB MASK signal is inactive, the synchronized ARB HOLD signal is inactive, the REF REQ PEND signal is inactive and the CPU CYC EN signal is inactive, the next state is IUA state 568. When DUA state 582 is the present state and the ARB MASK signal is inactive, the synchronized ARB HOLD signal is inactive, the REF REQ PEND signal is inactive and the CPU CYC EN signal is active, the next state is CUA state 566. When DUA state 582 is the present state and the ARB MASK signal is inactive, the synchronized ARB HOLD signal is inactive and the REF REQ PEND signal is active, the next state is RUA state 570. By providing DUA state 582, the DMA ACK signal remains active, thus following DMA controller 52 to initiate arbitration for I/O bus 18. Thus, system 10 is able to complete a DMA transfer in parallel with arbitrating for the next grant cycle of I/O bus 18.

Control can shift from IUA state 568 to MG state 576. More specifically, when IUA state 568 is the present state and the ARB MASK signal is inactive, the synchronized HLDA signal is active, the REF REQ PEND signal is inactive, the CPU CYC EN signal is inactive, the ARB SETTLE signal is active, the ARB BUS EQF signal is inactive, and the CHNL VALID signal is inactive, then the next state is MG state 576. When IUA state 568 is the present state and the ARB MASK signal is inactive, the synchronized HLDA signal is active, the REF REQ PEND signal is inactive, the CPU CYC EN signal is active, the TIMER TUP signal is active, the ARB SETTLE signal is active, the ARB BUS EQF signal is inactive, and the CHNL VALID signal is inactive, then the next state is MG state 576.

Control can also shift from RUA state 570 to CG state 572, MG state 574 or DG state 576. More specifically, when RUA state 570 is the present state and the ARB MASK signal is inactive, the REF DONE signal is active, the REF PEND signal is inactive, the CPU CYC EN signal is inactive, the ARB SETTLE signal is active, the ARB BUS EQF signal is active and the synchronized ARB HOLD signal is inactive, CG state 566 is the next state. When RUA state 570 is the present state and the ARB MASK signal is inactive, the REF DONE signal is active, the REF PEND signal is inactive, the CPU CYC EN signal is active, the TIMER TUP signal is inactive, the ARB SETTLE signal is active, the ARB BUS EQF signal is active and the synchronized ARB HOLD signal is inactive, CG state 566 is also the next state. When RUA state 570 is the present state and the ARB MASK signal is inactive, the REF DONE signal is active, the REF PEND signal is inactive, the CPU CYC EN signal is active, the TIMER TUP signal is active, the ARB SETTLE signal is active, the ARB BUS EQF signal is active and the synchronized ARB HOLD signal is inactive, CG state 572 is also the next state. When RUA state 570 is the present state and the ARB MASK signal is inactive, the REF DONE signal is active, the REF PEND signal is inactive, the CPU CYC EN signal is inactive, the ARB SETTLE signal is active, the ARB BUS EQF signal is active, the CHNL VALID signal is inactive and the synchronized ARB HOLD signal is inactive, MG state 574 is the next state. When RUA state 570 is the present state and the ARB MASK signal is inactive, the REF DONE signal is active, the REF PEND signal is inactive, the CPU CYC EN signal is active, the TIMER TUP signal is active, the ARB SETTLE signal is active, the ARB BUS EQF signal is inactive, the CHNL VALID signal is inactive and the synchronized ARB HOLD signal is inactive, MG state 574 is also the next state. When RUA state 570 is the present state and the ARB MASK signal is inactive, the REF DONE signal is active, the REF PEND signal is inactive, the CPU CYC EN signal is inactive, the ARB SETTLE signal is active, the ARB BUS EQF signal is inactive, the CHNL VALID signal is active and the synchronized ARB HOLD signal is inactive, DG state 576 is the next state. When RUA state 570 is the present state and the ARB MASK signal is inactive, the REF DONE signal is active, the REF PEND signal is inactive, the CPU CYC EN signal is active, the TIMER TUP signal is active, the ARB SETTLE signal is active, the ARB BUS EQF signal is inactive, the CHNL VALID signal is active and the synchronized ARB HOLD signal is inactive, DG state 576 is also the next state.

Control may also return to masked arbitration portion 550 from CUA state 566, IUA state 568, RUA state 570 or DUA state 582. More specifically, when CUA state 566 is the present state and the ARB MASK signal goes active, the synchronized HLDA signal is inactive and the REF REQ PEND signal is inactive then the next state is CMA state 560. When CUA state 566 is the present state and the ARB MASK signal is active and the synchronized HLDA signal is active, then the next state is also CMA state 560. When CUA state 566 is the present state and the ARB MASK signal goes active, the synchronized HLDA signal is inactive and the REF REQ PEND signal is active then the next state is IMA state 562.

When IUA state 566 is the present state and the ARB MASK signal is active, the synchronized HLDA signal is inactive and the synchronized ARB HOLD signal is inactive, then the next state is IMA state 562. When IUA state 566 is the present state and the ARB MASK signal is active and the synchronized ARB HOLD signal is active, then the next state is also IMA state 562; thus allowing a device to complete a transfer while CACP 53 returns to an idle condition. The transition from IUA state 566 to IMA state 562 insures that CACP state machine 534 remains in an idle state and thus that CACP controller does not reallocate I/O bus 18 to a new controller device. When IUA state 566 is the present state and the ARB MASK signal is active, the synchronized HLDA signal is active, the REF REQ PEND signal is inactive and the synchronized ARB HOLD signal is inactive, then the next state is CMA state 560. When IUA state 566 is the present state and the ARB MASK signal is active, the synchronized HLDA signal is active, the REF REQ PEND signal is active and the synchronized ARB HOLD signal is inactive, then the next state is RMA state 564.

When RUA state 566 is the present state and the ARB MASK signal is active and the REF DONE signal is inactive, then RMA state 564 is the next state. When RUA state 566 is the present state and the ARB MASK signal is active, the REF DONE signal is active, the REF PEND signal is inactive and the synchronized ARB HOLD signal is inactive, then CMA state 560 is the next state. When RUA state 566 is the present state and the ARB MASK signal is active, the REF DONE signal is active, the REF PEND signal is inactive and the synchronized ARB HOLD signal is active, the IMA state 562 is the next state. The transition from RUA state 566 to IMA state 562 locks CACP state machine 534 in an idle state to allow a device to steal cycles between the end of a refresh function and the allocation of I/O bus 18 to another controller device. When RUA state 566 is the present state and the ARB MASK signal is active, the REF DONE signal is active and the REF PEND signal is active, then IMA state 562 is the next state.

Control may also shift from the states of grant portion 554, i.e., CG state 572, MG state 574, MGA state 578, DG state 576 and DGA state 580, to masked arbitration portion 550. More specifically, when CG state 572 is the present state and the ARB MASK signal is active and the synchronized HLDA signal is active, then the next state is CMA state 560. When CG state 572 is the present state and the ARB MASK signal is active, the synchronized HLDA signal is inactive and the REF REQ PEND signal is inactive, then the next state is CMA state 560. When CG state 572 is the present state and the ARB MASK signal is active, the synchronized HLDA signal is inactive and the REF REQ PEND signal is active, then the next state is IMA state 560.

When MG state 574 is the present state and the ARB MASK signal is active, then the next state is IMA state 562. When MGA state 578 is the present state and the ARB MASK signal is active, then the next state is also IMA state 562.

When DG state 576 is the present state and the ARB MASK signal is active then the next state is DMA masked arbitration (DMA) state 584. While in DMA state 584, the ARB/GRANT signal is in the arbitration state, the CPU HOLD signal is active, the REFRESH ACK signal is inactive, the DMA ACK signal is active and the ARB MASK signal is active. During DMA state 584, next state generator circuit 542 monitors the ARB MASK signal and the synchronized CHNL ACT signal. When DMA state 584 is the present state and the synchronized ARB HOKD signal is active the next state is also DMA state 584. The transition from DMA state 582 to DMA state 582 indicates that DMA controller 52 is currently flushing the data information which is stored in it; this transition insures that CACP 53 does not reallocate I/O bus 18 while DMA controller 52 is active however, CACP 53 may be arbitrating for the next grant cycle. When DMA state 584 is the present state and the synchronized ARB HOLD signal is inactive, the next state is IMA state 562. By providing DMA state 584, a DMA transfer may remain active to allow DMA controller 52 to finish cycle for transfer. In this way, DMA state 584 allows for orderly recovery from a bus error.

When DGA is the present state and the ARB MASK signal is active, then the next state is DMA state 584. Alternately, when DUA state 582 of unmasked arbitration portion 552 is the present state and the ARB MASK signal is active, then the next state is also DMA state 582.

Figure 6:
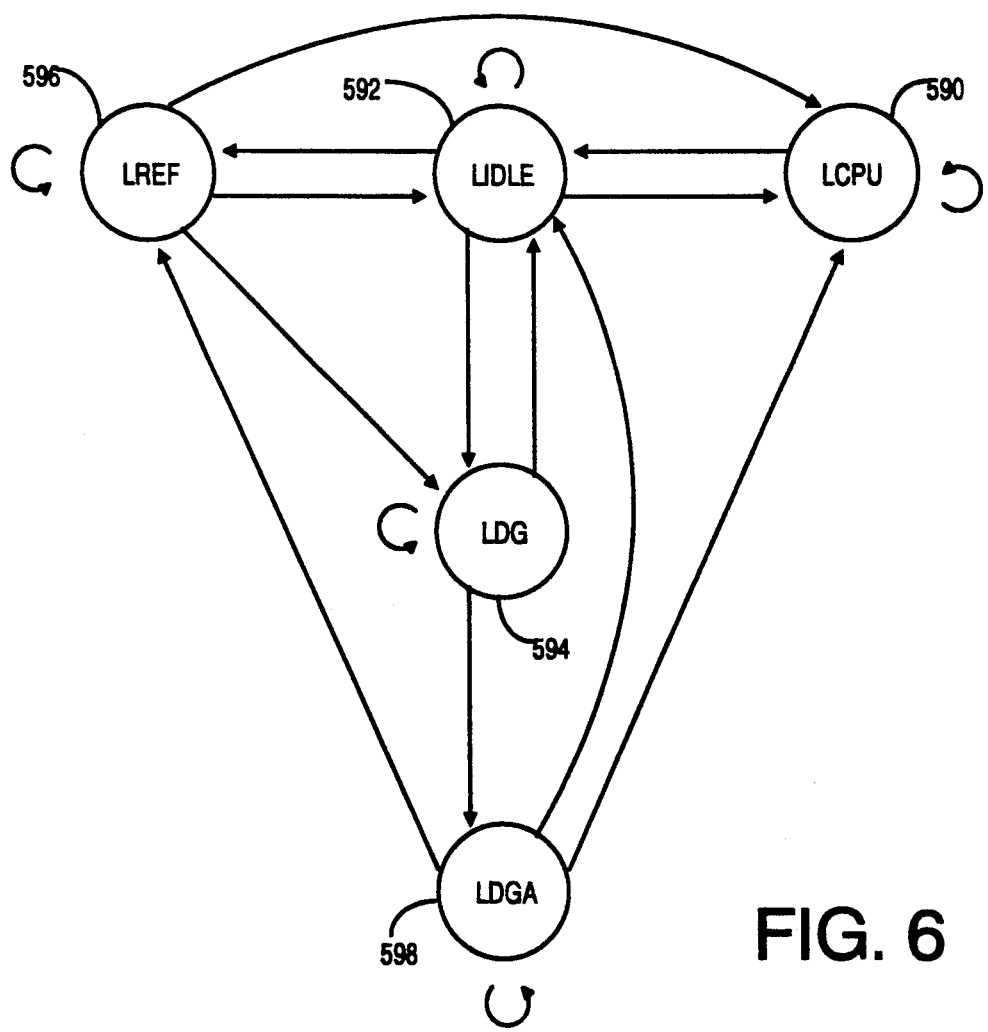
FIG. 6 is a state diagram of the operation of the local arbitration control point of the FIG. 2 CACP circuit.

Referring to FIG. 6, arbitration control state machine 540 uses LACP state machine 520 when, upon power-on, the CACP MODE signal is inactive; control remains with LACP state machine 520 unless the configuration of computer system 10 is changed. When arbitration control state machine 540, and thus CACP 53, are using LACP state machine 520, CACP 53 is operating in a local mode. When operating in a local mode, arbitration of CACP 53 is under control of another central arbitration control point. Thus, LACP state machine 520 need not perform many of the control functions of CACP state machine 534.

More specifically, upon power-on of computer system 10, LACP state machine starts control in local CPU (LCPU) state 590. While in LCPU state 590, the HOLD signal is inactive, the REF ACK signal is inactive and the DMA ACK signal is inactive. While in LCPU state 590, LACP state machine 520 monitors the synchronized HLDA signal, the REF REQ PEND signal, the ARB/GRANT signal and the CHNL VALID signal. When LCPU state 590 is the present state and the synchronized HLDA signal is inactive, the REF REQ PEND signal is inactive, the ARB/GRANT signal is in the grant state and the CHNL VALID signal is inactive, then the next state is also LCPU state 590. When LCPU state 590 is the present state and the synchronized HLDA signal is inactive, the REF REQ PEND signal is inactive and the ARB/GRANT signal is in the arbitration state, then the next state is also LCPU state 590. When LCPU state 590 is the present state and the synchronized HLDA signal is active, then the next state is also LCPU state 590. When LCPU state 590 is the present state and the synchronized HLDA signal is inactive, the REF REQ PEND signal is inactive, the ARB/GRANT signal is in the grant state and the CHNL VALID signal is active, then the next state is local idle (LIDLE) state 592. When LCPU state 590 is the present state and the synchronized HLDA signal is inactive and the REF REQ PEND signal is active, then the next state is also LCPU state 590.

While in LIDLE state 592, the HOLD signal is active, the REF ACK signal is inactive, and the DMA ACK signal is inactive. While in LIDLE state 592, LACP state machine 520 monitors the synchronized HLDA signal, the REF REQ PEND signal, the ARB/GRANT signal and the CHNL VALID signal. When LIDLE state 592 is the present state and the synchronized HLDA signal is inactive, then the next state is also LIDLE state 592. When LIDLE state 592 is the present state, and the synchronized HLDA signal is active, the REF REQ PEND signal is inactive, the ARB/GRANT signal is in the grant state and the CHNL VALID signal is inactive, then the next state is LCPU state 590. When LIDLE state 592 is the present state, and the synchronized HLDA signal is active, the REF REQ PEND signal is inactive and the ARB/GRANT signal is in the arbitration state, then the next state is LCPU state 590. When LIDLE state 592 is the present state, and the synchronized HLDA signal is active, the REF REQ PEND signal is inactive, the ARB/GRANT signal is in the grant state and the CHNL VALID signal is active, then the next state is local DMA grant (LDG) state 594. When LIDLE state 592 is the present state, and the synchronized HLDA signal is active and the REF REQ PEND signal is active, then the next state is local refresh state 596.

While in LREF state 596, the HOLD signal is active, the REF ACK signal is active, and the DMA ACK signal is inactive. While in LREF state 596, LACP state machine 520 monitors the REF REQ PEND signal, the ARB/GRANT signal, the CHNL VALID signal and the REF DONE signal. When LREF state 596 is the present state and the REF DONE signal is inactive, then the next state is also LREF state 596. When LREF state 596 is the present state and the REF REQ PEND signal is inactive, the ARB/GRANT signal is in the grant state, the CHNL VALID signal is inactive and the REF DONE signal is active, then the next state is LCPU state 590. When LREF state 596 is the present state and the REF REQ PEND signal is inactive, the ARB/GRANT signal is in the grant state, the CHNL VALID signal is active and the REF DONE signal is active, then the next state is LDG state 594 When LREF state 596 is the present state and the REF REQ PEND signal is inactive, the ARB/GRANT signal is in the arbitration state and the REF DONE signal is active, then the next state is LCPU state 590. When LREF state 596 is the present state and the REF REQ PEND signal is active and the REF DONE signal is active, then the next state is LIDLE state 596.

While in LDG state 594, the HOLD signal is active, the REF ACK signal is inactive, the DMA ACK signal is active and the DMA ACTIVE signal is inactive. While in LDG state 594, LACP state machine 520 monitors the ARB/GRANT signal and the DMA ACTIVE signal. When LDG state 594 is the present state and the ARB/GRANT signal is in the grant state and the DMA ACTIVE signal is inactive, then the next state is LDG state 594. When LDG state 594 is the present state and the ARB/GRANT signal is in the grant state and the DMA ACTIVE signal is active, then the next state is local DMA grant active (LDGA) state 598. When LDG state 594 is the present state and the ARB/GRANT signal is in the arbitration state, then the next state is LIDLE state 592.

While in LDGA state 598, the HOLD signal is active, the REF ACK signal is inactive, the DMA ACK signal is active and the DMA ACTIVE signal is active. While in LDGA state 598, LACP state machine 520 monitors the ARB/GRANT signal, the REF REQ PEND signal and the DMA ACTIVE signal. When LDGA state 598 is the present state and the ARB/GRANT signal is in the arbitration state and the DMA ACTIVE signal is active, then the next state is also LDGA state 598. When LDGA state 598 is the present state and the ARB/GRANT signal is in the grant state and the DMA ACTIVE signal is active, then the next state is also LDGA state 598. When LDGA state 598 is the present state and the ARB/GRANT signal is in the grant state, the DMA ACTIVE signal is inactive and the REF REQ PEND signal is inactive, then the next state is LCPU state 590. When LDGA state 598 is the present state and the ARB/GRANT signal is in the grant state, the DMA ACTIVE signal is inactive and the REF REQ PEND signal is active, then the next state is LREF state 596. When LDGA state 598 is the present state and the ARB/GRANT signal is in the grant state and the DMA ACTIVE signal is active, then the next state is LIDLE state 592.

Figure 7:
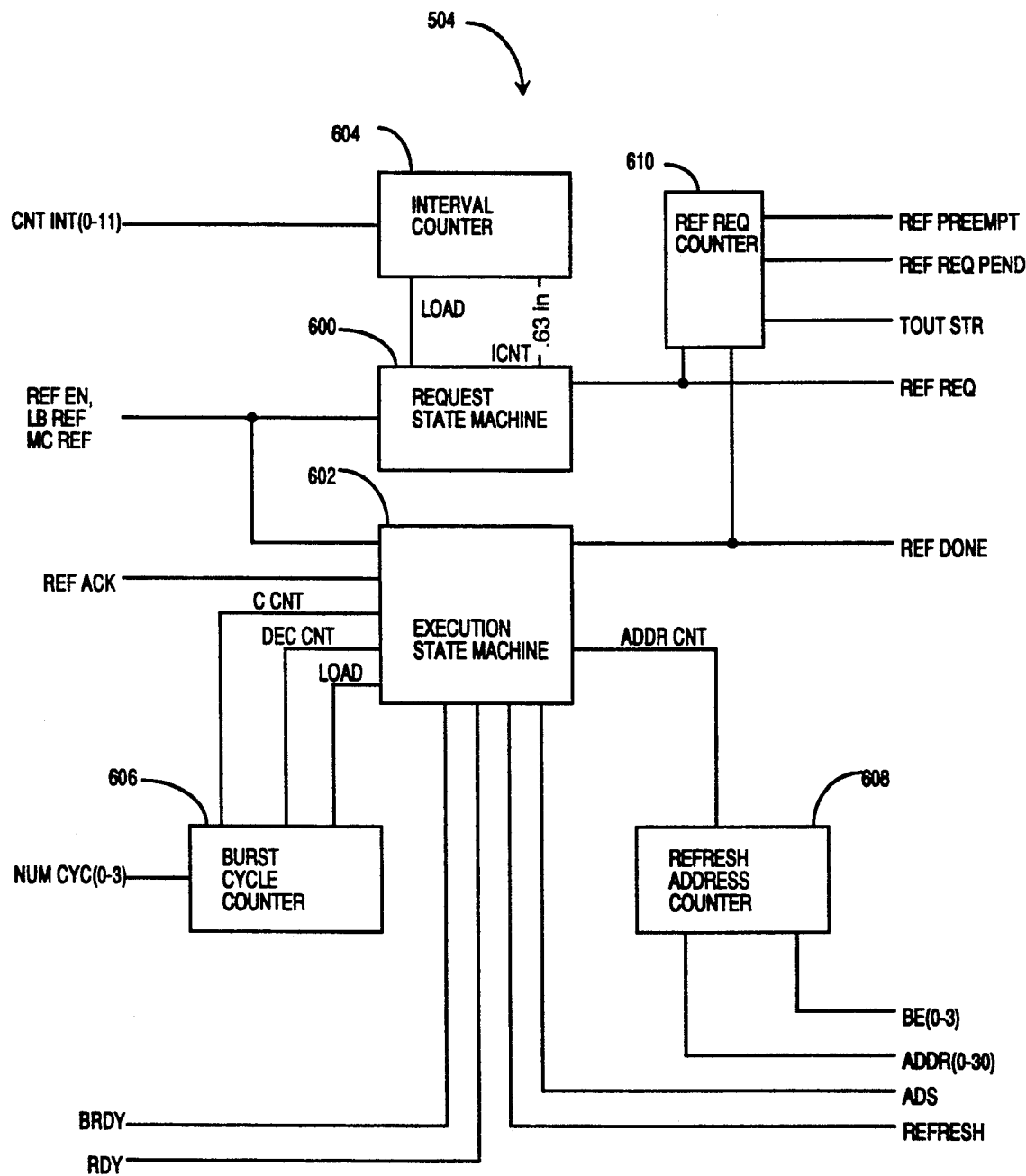
FIG. 7 is a schematic-block diagram of a refresh timer and control circuit of the FIG. 2 CACP circuit.

Referring to FIG. 7, refresh timer and control circuit 504 includes request state machine 600, refresh execution state machine 602, refresh request interval counter 604, burst cycle counter 606, refresh address counter 608 and refresh request pending counter 610. Refresh request state machine 600 receives a refresh enable signal (REF EN) as well as refresh selection signals (LB REF, MC REF), which are part of the refresh configuration information. The REF EN signal indicates when refresh is enabled; this signal is generally activated during power-on, before the memory has been verified. The LB REF signal and the MC REF signal indicate when refresh is enabled for a respective bus. Refresh request state machine also receives an interval count indication signal (ICNT) from interval counter 604 to indicate that a refresh interval has transpired. Refresh request state machine generates the REF REQ pulse, which is provided to refresh request pending counter 610 as well as to LACP state machine 520 and CACP state machine 534. Interval counter 604 is a 12 bit counter which receives a counter interval signal (CNT INT(0-11)), which is part of the refresh configuration information, as well as a load counter signal (LOAD) from refresh request state machine 600. The CNT INT signal indicates the refresh interval; the count is started each time the LOAD signal is activated. This interval is variable based upon the CNT INT signal and thus can be adjusted to accommodate different types of memory and chip frequencies. For the present application, the refresh interval is set to 15.6 microseconds.

Refresh execution state machine 602 receives the REF ACK signal from CACP state machine 534, the RDY signal and the BRDY signal, as well as a cycle count signal (CCNT) from burst cycle counter 606. Refresh execution state machine 602 provides the ADS signal and the REFRESH signal as well as a decrement count signal (DEC CNT) and a load counter signal (LOAD), which are provided to burst cycle counter 606, and an address count indication signal (ADDR CNT), which is provided to refresh address counter 608 to increment the refresh address. Burst cycle counter 606 also receives a cycle number signal (NUM CYC), which indicates how many refresh cycles may be bursted (i.e., may be performed back to back (i.e., contiguously) during a single refresh operation) and is part of the refresh configuration information.

Refresh request pending counter 610 receives the REF REQ pulse from request state machine 600 and the REF DONE signal from execution state machine 602 as well as the REF ACK signal from CACP state machine 534. Refresh request pending counter 610 generates the REF REQ PEND signal and the TOUT STR signal based upon the REF REQ signal, the REF ACK signal and the REF DONE signal. More specifically, every time a REF REQ pulse is received, the REF REQ PEND signal is activated and counter 610 is incremented. When three REF REQ pulses have been received without a subsequent refresh cycle being performed, then refresh request pending counter 610 activates the TOUT STR signal. When counter 610 receives an active REF ACK signal then counter 610 is enabled to decrement the refresh request count; thereafter, every time an active REF DONE signal is received while the REF ACK signal is active, the refresh request count is decremented. Thus counter 610 allows up to three refresh requests to be queued for execution while waiting for I/O bus 18. The REF REQ PEND signal alerts LACP state machine 520 and CACP state machine 534 that one or more refresh requests need servicing. Upon queueing the third refresh request pulse, refresh timer and control circuit 504 generates the TOUT STR signal which instructs CACP state machine 534 to forcibly take ownership of I/O bus 18 (i.e., to overrule the control signals of whatever device currently has ownership of the bus) and perform the queued refresh operations.

Refresh timer and control 504 also provides a selective refresh function in which it may disable the memory refresh function; refresh memory on a single bus (e.g., such as I/O bus 18 or the local processor bus); or, refresh memory on both buses simultaneously. Such a function advantageously allows CACP 53 to be used in a plurality of different types of computer systems. For example, CACP 53 may be used in a single bus computer system (i.e., a computer system where CACP 53 is connected directly to a corresponding I/O bus). Alternatively, CACP 53 may be used in a dual bus computer system such as computer system 10 in which CACP 53 is connected to a processor bus and connected via a bus interface circuit 54 to an I/O bus.

Figure 8:
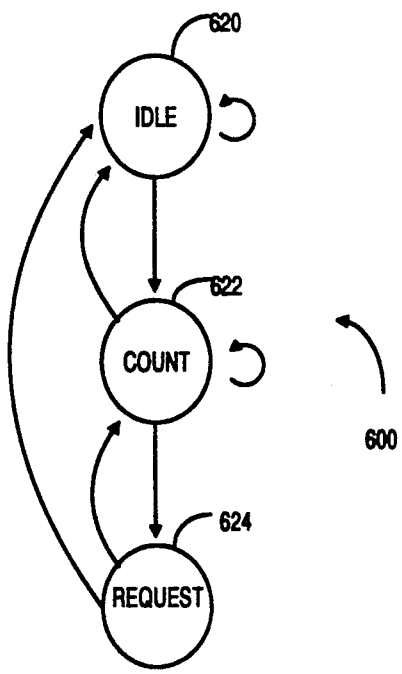
FIG. 8 is a state diagram of a refresh request state machine of the FIG. 7 refresh timer and control circuit.

More specifically, referring to FIGS. 7 and 8, when computer system 10 is powered-on, refresh request state machine 600 is in idle state 620. When the REF EN signal is activated and either the LB REF signal or the MC REF signal of both the LB REF and MC REF signals are activated, then control passes to count state 622 and counter 604 is loaded. Control remains in count state 622 while interval counter 604 is counting a refresh interval and thus while the ICNT signal is inactive. When the ICNT signal goes active, indicating that a refresh interval has transpired, then control passes to request state 624 which generates the REF REQ pulse. If the REF EN signal is active then control passes back to count state 622 which initiates another interval count by activating the LOAD signal. Control cycles between count state 622 and request state 624 until the REF EN signal goes inactive, at which point control passes back to idle state 620 from either count state 622 or request state 624.

Figure 9:
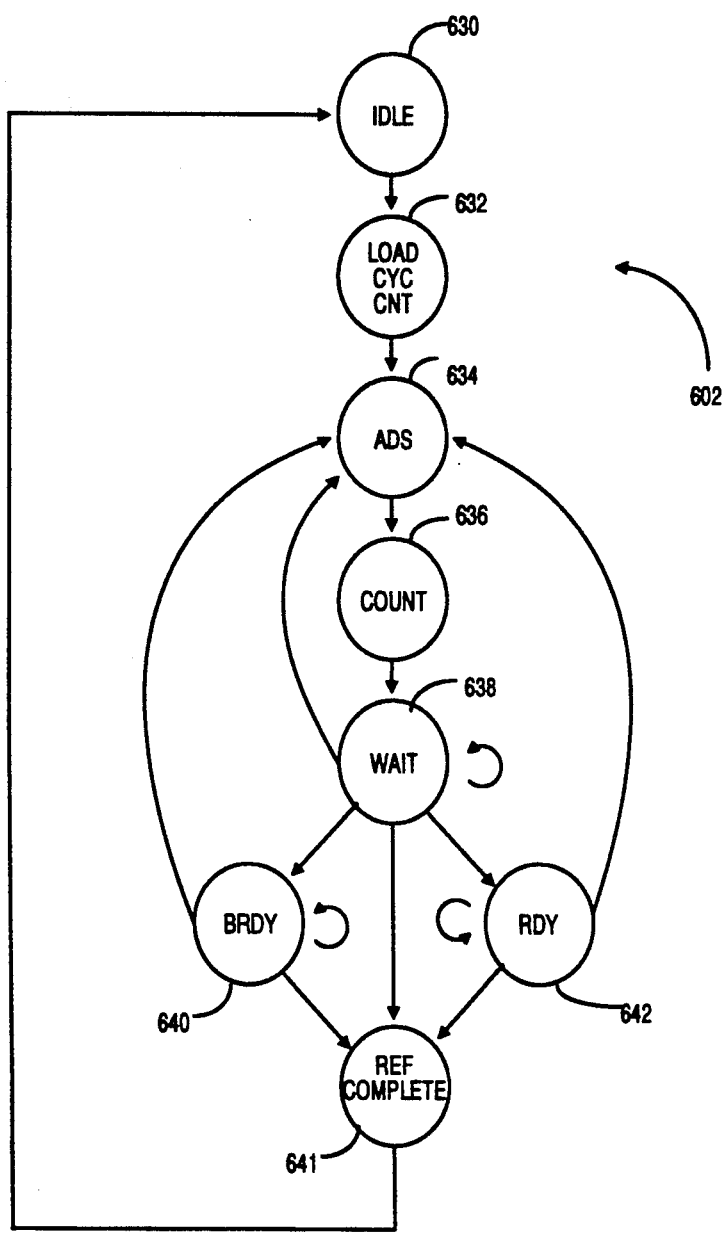
FIG. 9 is a state diagram of a refresh execution state machine of the FIG. 7 refresh timer and control circuit.

Referring to FIGS. 7 and 9, control of refresh execution state machine 602 starts in idle state 630. When the REF ACK signal is received in conjunction with an active REF EN signal, then control passes to load cycle count state 632, in which the LOAD signal is activated and cycle counter 606 is loaded with the NUM CYC value. Control then passes to address strobe state 634 which strobes the ADS signal. Control then passes to count state 636 in which burst cycle counter 606 is decremented and refresh address counter 608 is incremented. Control then passes to wait state 638.

While control is in wait state 638, control remains in wait state 638 when one of the following modes is selected: the RDY signal is inactive, the BRDY signal is inactive, the LB REF signal is active and the MC REF signal is active; when the BRDY signal is inactive and the LB REF signal is active; or, when the RDY signal is inactive and the MC REF signal is active. While control is in wait state 638, when the CCNT signal is inactive and either the LB REF and the BRDY signal are active or the MC REF and RDY signals are active or the LB REF, MC REF, RDY and BRDY signals are active, then control passes back to address strobe state 634. This state transition indicates that burst refresh cycles have been selected for execution as indicated by the NUM CYC signal.

While control is in wait state 638, when the LB REF signal is active, the MC REF signal is active, the RDY signal is active and the BRDY signal is inactive, then control passes to BRDY wait state 640. Control remains in BRDY wait state 640 until the BRDY signal goes active. While in BRDY wait state 640, when the CCNT signal is inactive and the BRDY signal is active then control passes to address strobe state 634 and another refresh cycle is initiated. When the BRDY signal goes active and the CCNT signal is active, then control passes to refresh complete state 641.

While control is in wait state 638, when the LB REF signal is active, the MC REF signal is active, the RDY signal is inactive and the BRDY signal is active, then the next state is RDY wait state 642. Control remains in RDY wait state 642 until the RDY signal goes active. When the RDY signal goes active and the CCNT is inactive, then control passes to address strobe state 634 and another refresh cycle is initiated. When the RDY signal goes active and the CCNT signal is active, then control passes to refresh complete state 641.

While control is in wait state 638, when the CCNT signal is active, and either the LB REF signal and the BRDY signal are active or the MC REF signal and the RDY signal are active or the LB REF signal, the MC REF signal, the RDY signal and the BRDY signal are active, then control passes to refresh complete state 641. In refresh complete state 641, refresh execution state machine activates the REF DONE signal and control passes back to idle state 630.

Figure 10:
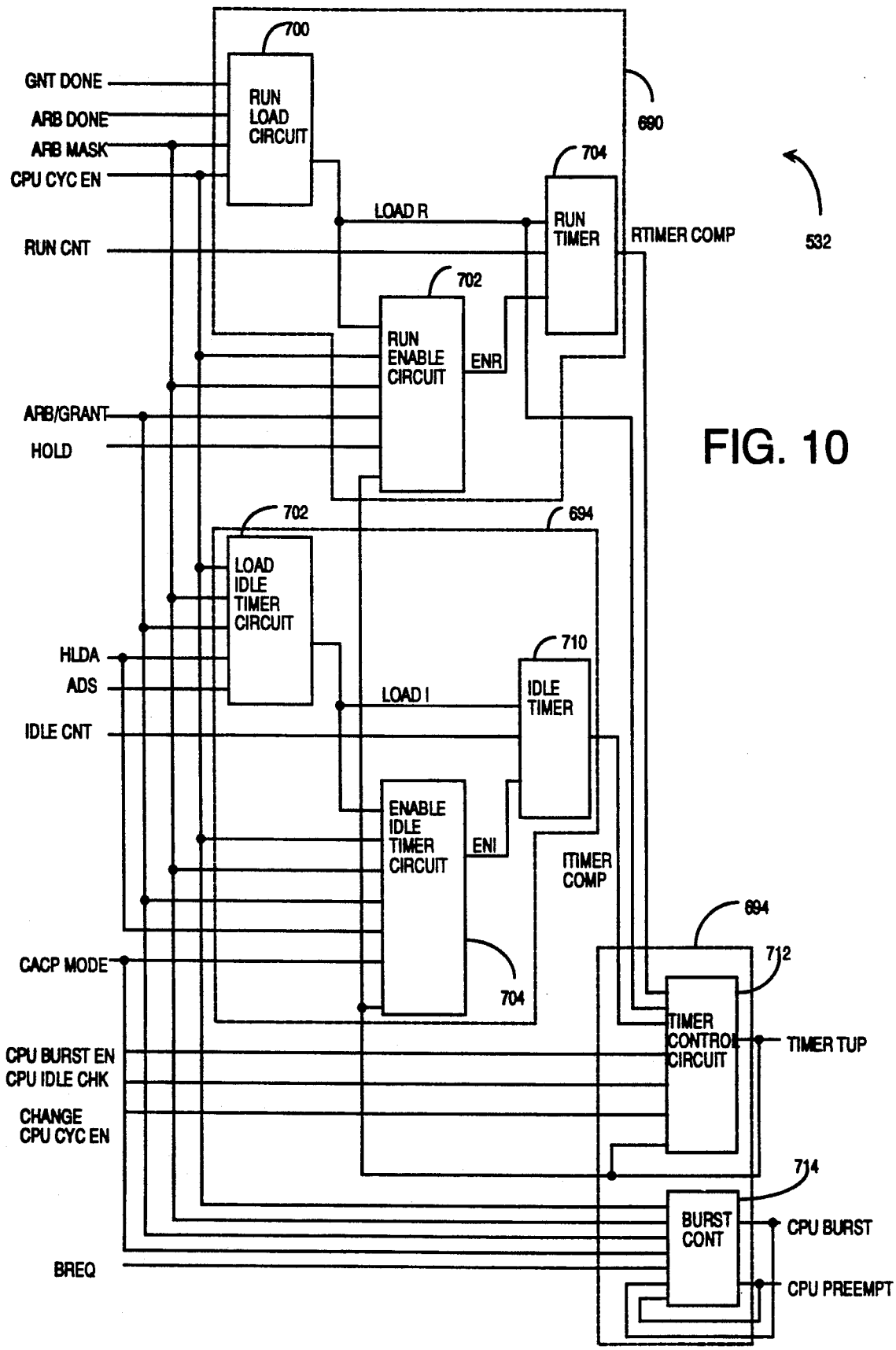
FIG. 10 is a schematic-block diagram of a CPU timer and control circuit of the FIG. 2 CACP circuit.

Referring to FIG. 10, CPU control circuit 532 includes run timer portion 690, idle timer portion 692 and control portion 694. Run timer portion 690 includes load run timer circuit 700, enable run timer circuit 702 and run timer circuit 704. Idle timer portion 692 includes load idle timer circuit 706, enable idle timer circuit 708 and idle timer circuit 710. CPU control portion includes timer control circuit 712 and burst control circuit 714. Run timer portion 690 counts down to zero starting with the maximum time that processor 30 may control I/O bus 18; idle timer portion 692 counts down to zero starting with the maximum time that processor 30 may be inactive while controlling I/O bus 18 before processor 30 must relinquish control of I/O bus 18. Idle timer portion 692 is reinitialized every time the ADS signal goes active. When the count of run timer portion 690 equals zero, then run timer portion 690 generates an active run timer compare signal (RTIMER COMP). When the count of idle timer portion 692 equals zero, then idle timer portion 692 generates an active idle timer compare signal (ITIMER COMP). The idle timer signal may be used in cache systems, in which processor 30 may only need to control one I/O cycle to accomplish a transfer. By using the run timer count and the idle timer count it is possible for CACP 53 to dynamically adjust the time that processor 30 may control I/O bus 18.

Run timer 704 is controlled by a load run timer signal (LOAD R), which is generated by load run timer circuit 700 and indicates when to reinitialize the run timer, and an enable run timer signal (EN R), which is generated by load run timer circuit 702 and indicates when the run timer is enabled to count down. Idle timer 710 is controlled by a load idle timer signal (LOAD I), which is generated by load idle timer circuit 706 and indicates when to reinitialize the idle timer, and an enable idle timer signal (EN I), which is generated by enable idle timer circuit 708 and indicates when the idle timer is enabled to count down.

When generating the LOAD R signal, load run timer circuit monitors the ARB MASK signal, the CPU CYC EN signal, the GNT DONE signal and the ARB DONE signal. When the ARB MASK signal is inactive, the CPU CYC EN signal is inactive and the GNT DONE signal is inactive, then the LOAD R signal is inactive. When the ARB MASK signal is inactive, the CPU CYC EN signal is inactive and the GNT DONE signal is active, then the LOAD R signal is active. When the ARB MASK signal is inactive, the CPU CYC EN signal is active and the ARB DONE signal is active, then the LOAD R signal is active. When the ARB MASK signal is inactive, the CPU CYC EN signal is active and the ARB DONE signal is inactive, then the LOAD R signal is inactive. When the ARB MASK signal is active, then the LOAD R signal is active.

Enable run timer circuit 702 monitors the CACP MODE signal, the ARB MASK signal, the CPU CYC EN signal, the ARB/GRANT signal, the HOLD signal, the TIMER TUP signal and the LOAD R signal when determining the state of the EN R signal. When the CACP MODE signal is inactive, the EN R signal is inactive. When the CACP MODE is active, the ARB MASK signal is inactive, the CPU CYC EN signal is inactive, the ARB/GRANT signal is inactive, the HOLD signal is inactive, the TIMER TUP signal is inactive and the LOAD R signal is inactive, then the EN R signal is active. When the CACP MODE is active, the ARB MASK signal is inactive, the CPU CYC EN signal is inactive, the ARB/GRANT signal is in the grant state, the HOLD signal is inactive, the TIMER TUP signal is inactive and the LOAD R signal is active, then the EN R signal is inactive. When the CACP MODE is active, the ARB MASK signal is inactive, the CPU CYC EN signal is inactive, the ARB/GRANT signal is in the grant state, the HOLD signal is inactive and the TIMER TUP signal is active, then the EN R signal is inactive. When the CACP MODE is active, the ARB MASK signal is inactive, the CPU CYC EN signal is inactive, the ARB/GRANT signal is in the grant state and the HOLD signal is active, then the EN R signal is inactive. When the CACP MODE is active, the ARB MASK signal is inactive, the CPU CYC EN signal is inactive, the ARB/GRANT signal is in the arbitration state, then the EN R signal is inactive. When the CACP MODE is active, the ARB/GRANT signal is in the grant state, then the EN R signal is inactive. When the CACP MODE is active, the ARB MASK signal is inactive, the CPU CYC EN signal is active, the ARB/GRANT signal is in the arbitration state, the HOLD signal is inactive, the TIMER TUP signal is inactive and the LOAD R signal is inactive, then the EN R signal is active. When the CACP MODE is active, the ARB MASK signal is inactive, the CPU CYC EN signal is inactive, the ARB/GRANT signal is in the arbitration state, the HOLD signal is inactive, the TIMER TUP signal is inactive and the LOAD R signal is active, then the EN R signal is inactive. When the CACP MODE is active, the ARB MASK signal is inactive, the CPU CYC EN signal is inactive, the ARB/GRANT signal is in the arbitration state, the HOLD signal is inactive and the TIMER TUP signal is active, then the EN R signal is inactive. When the CACP MODE is active, the ARB MASK signal is inactive, the CPU CYC EN signal is inactive, the ARB/GRANT signal is in the arbitration state and the HOLD signal is active, then the EN R signal is inactive. When the CACP MODE signal is active and the ARB MASK signal is active, then the EN R signal is inactive.

Load idle timer circuit 706 monitors the ARB MASK signal, the CPU CYC EN signal, the ARB/GRANT signal, the synchronized HLDA signal and the latched ADS signal when determining the state of the LOAD I signal. When the ARB MASK signal is inactive, the CPU CYC EN signal is inactive, the ARB/GRANT signal is in the grant state, the synchronized HLDA signal is inactive and the latched ADS signal is inactive, the LOAD I signal is inactive. When the ARB MASK signal is inactive, the CPU CYC EN signal is inactive, the ARB/GRANT signal is in the grant state, the synchronized HLDA signal is inactive and the latched ADS signal is active, the LOAD I signal is active. When the ARB MASK signal is inactive, the CPU CYC EN signal is inactive, the ARB/GRANT signal is in the grant state and the synchronized HLDA signal is active, the LOAD I signal is inactive. When the ARB MASK signal is inactive, the CPU CYC EN signal is inactive and the ARB/GRANT signal is in the arbitration state, the LOAD I signal is active. When the ARB MASK signal is inactive, the CPU CYC EN signal is active and the ARB/GRANT signal is in the grant state, the LOAD I signal is active. When the ARB MASK signal is inactive, the CPU CYC EN signal is active, the ARB/GRANT signal is in the arbitration state, the synchronized HLDA signal is inactive and the latched ADS signal is inactive, the LOAD I signal is inactive. When the ARB MASK signal is inactive, the CPU CYC EN signal is active, the ARB/GRANT signal is in the arbitration state, the synchronized HLDA signal is inactive and the latched ADS signal is active, the LOAD I signal is active. When the ARB MASK signal is inactive, the CPU CYC EN signal is active, the ARB/GRANT signal is in the arbitration state and the synchronized HLDA signal is active, the LOAD I signal is inactive. When the ARB MASK signal is active, the LOAD I signal is active.

When generating the EN I signal, enable idle timer circuit 708 monitors the CACP MODE signal, the ARB MASK signal, the CPU CYC EN signal, the ARB/GRANT signal, the HLDA signal, the TIMER TUP signal and the LOAD TIMER signal. When the CACP MODE signal is inactive, the EN I signal is inactive. When the CACP MODE signal is active, the ARB MASK signal is inactive, the CPU CYC EN signal is inactive, the ARB/GRANT signal is in the grant state, the HLDA signal is inactive, the TIMER TUP signal is inactive, and the LOAD I signal is inactive, the EN I signal is active. When the CACP MODE signal is active, the ARB MASK signal is inactive, the CPU CYC EN signal is inactive, the ARB/GRANT signal is in the grant state, the HLDA signal is inactive, the TIMER TUP signal is inactive, and the LOAD I signal is active, the EN I signal is inactive. When the CACP MODE signal is active, the ARB MASK signal is inactive, the CPU CYC EN signal is inactive, the ARB/GRANT signal is in the grant state, the HLDA signal is inactive and the TIMER TUP signal is active, the EN I signal is inactive. When the CACP MODE signal is active, the ARB MASK signal is inactive, the CPU CYC EN signal is inactive, the ARB/GRANT signal is in the grant state and the HLDA signal is active, the EN I signal is inactive. When the CACP MODE signal is active, the ARB MASK signal is inactive, the CPU CYC EN signal is active and the ARB/GRANT signal is in the arbitration state, the EN I signal is inactive. When the CACP MODE signal is active, the ARB MASK signal is inactive, the CPU CYC EN signal is active and the ARB/GRANT signal is in the grant state, the EN I signal is inactive. When the CACP MODE signal is active, the ARB MASK signal is inactive, the CPU CYC EN signal is active, the ARB/GRANT signal is in the arbitration state, the HLDA signal is inactive, the TIMER TUP signal is inactive, and the LOAD I signal is inactive, the EN I signal is active. When the CACP MODE signal is active, the ARB MASK signal is inactive, the CPU CYC EN signal is active, the ARB/GRANT signal is in the arbitration state, the HLDA signal is inactive, the TIMER TUP signal is inactive, and the LOAD I signal is active, the EN I signal is inactive. When the CACP MODE signal is active, the ARB MASK signal is inactive, the CPU CYC EN signal is active, the ARB/GRANT signal is in the arbitration state, the HLDA signal is inactive and the TIMER TUP signal is active, the EN I signal is inactive. When the CACP MODE signal is active, the ARB MASK signal is inactive, the CPU CYC EN signal is active, the ARB/GRANT signal is in the arbitration state and the HLDA signal is active, the EN I signal is inactive.

When the CACP MODE signal is active and the ARB MASK signal is active, the EN I signal is inactive.

When generating the TIMER TUP signal, timer control circuit 712 monitors the CHANGE CPU CYC EN signal, the CPU CYCLE EN signal, the CPU BURST EN signal, the CPU PREEMPT signal, the ARB/GRANT signal, the LOAD R signal, the present TIMER TUP signal, the RTIMER COMP signal, the CPU IDLE CHK signal, and the ITIMER COMP signal. When the CHANGE CPU CYC EN signal is inactive, the CPU CYC EN signal is inactive and the CPU BURST EN signal is inactive then the next TIMER TUP signal is active. When the CHANGE CPU CYC EN signal is inactive, the CPU CYCLE EN signal is inactive, the CPU BURST EN signal is active, the LOAD R signal is inactive, the present TIMER TUP signal is inactive, the RTIMER COMP signal is inactive and the CPU IDLE CHK signal is inactive then the next TIMER TUP signal is inactive. When the CHANGE CPU CYC EN signal is inactive, the CPU CYCLE EN signal is inactive, the CPU BURST EN signal is active, the LOAD R signal is inactive, the present TIMER TUP signal is inactive, the RTIMER COMP signal is inactive, the CPU IDLE CHK signal is active and the ITIMER COMP signal is inactive then the next TIMER TUP signal is inactive. When the CHANGE CPU CYC EN signal is inactive, the CPU CYCLE EN signal is inactive, the CPU BURST EN signal is active, the LOAD R signal is inactive, the present TIMER TUP signal is inactive, the RTIMER COMP signal is inactive, the CPU IDLE CHK signal is active, and the ITIMER COMP signal is active then the next TIMER TUP signal is active. When the CHANGE CPU CYC EN signal is inactive, the CPU CYCLE EN signal is inactive, the CPU BURST EN signal is active, the LOAD R signal is inactive, the present TIMER TUP signal is inactive, and the RTIMER COMP signal is active then the next TIMER TUP signal is active. When the CHANGE CPU CYC EN signal is inactive, the CPU CYCLE EN signal is inactive, the CPU BURST EN signal is active, the LOAD R signal is inactive, and the present TIMER TUP signal is active then the next TIMER TUP signal is active. When the CHANGE CPU CYC EN signal is inactive, the CPU CYCLE EN signal is inactive, the CPU BURST EN signal is active, and the LOAD R signal is active then the next TIMER TUP signal is inactive. When the CHANGE CPU CYC EN signal is inactive, the CPU CYCLE EN signal is active, the CPU BURST EN signal is inactive, the CPU PREEMPT signal is inactive, the ARB/GRANT signal is inactive, the LOAD R signal is inactive, and the present TIMER TUP signal is inactive then the next TIMER TUP signal is inactive. When the CHANGE CPU CYC EN signal is inactive, the CPU CYCLE EN signal is active, the CPU BURST EN signal is inactive, the CPU PREEMPT signal is inactive, the ARB/GRANT signal is inactive, the LOAD R signal is inactive, and the present TIMER TUP signal is active then the next TIMER TUP signal is active. When the CHANGE CPU CYC EN signal is inactive, the CPU CYCLE EN signal is active, the CPU BURST EN signal is inactive, the CPU PREEMPT signal is inactive, the ARB/GRANT signal is inactive, and the LOAD R signal is active then the next TIMER TUP signal is inactive. When the CHANGE CPU CYC EN signal is inactive, the CPU CYCLE EN signal is active, the CPU BURST EN signal is inactive, the CPU PREEMPT signal is inactive, and the ARB/GRANT signal is active then the next TIMER TUP signal is active. When the CHANGE CPU CYC EN signal is inactive, the CPU CYCLE EN signal is active, the CPU BURST EN signal is inactive, the CPU PREEMPT signal is active, and the ARB/GRANT signal is inactive then the next TIMER TUP signal is inactive. When the CHANGE CPU CYC EN signal is inactive, the CPU CYCLE EN signal is active, the CPU BURST EN signal is inactive, the CPU PREEMPT signal is active, the ARB/GRANT signal is active, the present TIMER TUP signal is inactive, and the RTIMER COMP signal is inactive then the next TIMER TUP signal is inactive. When the CHANGE CPU CYC EN signal is inactive, the CPU CYCLE EN signal is active, the CPU BURST EN signal is inactive, the CPU PREEMPT signal is active, the ARB/GRANT signal is active, the present TIMER TUP signal is inactive, and the RTIMER COMP signal is active then the next TIMER TUP signal is active. When the CHANGE CPU CYC EN signal is inactive, the CPU CYCLE EN signal is active, the CPU BURST EN signal is inactive, the CPU PREEMPT signal is active, the ARB/GRANT signal is active, and the present TIMER TUP signal is active then the next TIMER TUP signal is active. When the CHANGE CPU CYC EN signal is inactive, the CPU CYCLE EN signal is active, the CPU BURST EN signal is active, the LOAD R signal is inactive, the present TIMER TUP signal is inactive, the RTIMER COMP signal is inactive, and the CPU IDLE CHK signal is inactive then the next TIMER TUP signal is inactive. When the CHANGE CPU CYC EN signal is inactive, the CPU CYCLE EN signal is active, the CPU BURST EN signal is active, the LOAD R signal is inactive, the present TIMER TUP signal is inactive, the RTIMER COMP signal is inactive, the CPU IDLE CHK signal is active, and the ITIMER COMP signal is inactive then the next TIMER TUP signal is inactive. When the CHANGE CPU CYC EN signal is inactive, the CPU CYCLE EN signal is active, the CPU BURST EN signal is active, the LOAD R signal is inactive, the present TIMER TUP signal is inactive, the RTIMER COMP signal is inactive, the CPU IDLE CHK signal is active, and the ITIMER COMP signal is active then the next TIMER TUP signal is active. When the CHANGE CPU CYC EN signal is inactive, the CPU CYCLE EN signal is active, the CPU BURST EN signal is active, the LOAD R signal is inactive, the present TIMER TUP signal is inactive, and the RTIMER COMP signal is active then the next TIMER TUP signal is active. When the CHANGE CPU CYC EN signal is inactive, the CPU CYCLE EN signal is active, the CPU BURST EN signal is active, the LOAD R signal is inactive, and the present TIMER TUP signal is active then the next TIMER TUP signal is active. When the CHANGE CPU CYC EN signal is inactive, the CPU CYCLE EN signal is active, the CPU BURST EN signal is active, and the LOAD R signal is active then the next TIMER TUP signal is inactive. When the CHANGE CPU CYC EN signal is active the next TIMER TUP signal is active.

CPU control circuit 532 monitors the CACP MODE signal, the ARB/GRANT signal, the HOLD signal, the BREQ signal and the present CPU PREEMPT signal to determine the next value of the CPU PREEMPT signal. The CPU PREEMPT signal is updated every system clock cycle. When the CACP MODE signal is active, the ARB/GRANT signal is in grant and the HOLD signal is inactive, then the next value of the CPU PREEMPT signal is inactive. When the CACP MODE signal is active, the ARB/GRANT signal is in the grant state, the HOLD signal is active and the BREQ signal is inactive, then the next value of the CPU PREEMPT signal is inactive. When the CACP MODE signal is active, the ARB/GRANT signal is in the grant state, the HOLD signal is active and the BREQ signal is active, then the next value of the CPU PREEMPT signal is active. When the CACP MODE signal is active, the ARB/GRANT signal is in the arbitration state and the HOLD signal is inactive, then the next value of the CPU PREEMPT signal is inactive. When the CACP MODE signal is active, the ARB/GRANT signal is in the arbitration state, the HOLD signal is active and the present CPU PREEMPT signal is inactive, then the next value of the CPU PREEMPT signal is inactive. When the CACP MODE signal is active, the ARB/GRANT signal is in the arbitration state, the HOLD signal is active and the present CPU PREEMPT signal is active, then the next value of the CPU PREEMPT signal is active. The CPU PREEMPT signal provides a means for CACP 53 to dynamically request time for the CPU, but only when the CPU requires it. With the ability to preempt I/O bus 18, the CPU can insure that an arbitration cycle will occur within 7.8 microseconds, thus insuring that it cannot be locked off of I/O bus 18 for extended periods of time.

Burst control circuit 714 monitors the ARB MASK signal, the ARB/GRANT signal, the present CPU BURST signal, the CPU CYC EN signal and the CPU PREEMPT signal to determine the next value of the CPU BURST signal. The CPU BURST signal is updated every system clock cycle. When the ARB MASK signal is inactive, the ARB/GRANT signal is in the grant state and the present CPU BURST signal is inactive, then the next value of the CPU BURST signal is inactive. When the ARB MASK signal is inactive, the ARB/GRANT signal is in the grant state and the present CPU BURST signal is active, then the next value of the CPU BURST signal is active. When the ARB MASK signal is inactive, the ARB/GRANT signal is in the arbitration state, the CPU CYC EN signal is inactive and the CPU PREEMPT signal is inactive, then the next value of the CPU BURST signal is inactive. When the ARB MASK signal is inactive, the ARB/GRANT signal is in the arbitration state, the CPU CYC EN signal is inactive and the CPU PREEMPT signal is active, then the next value of the CPU BURST signal is active. When the ARB MASK signal is inactive, the ARB/GRANT signal is in the arbitration state and the CPU CYC EN signal is active, then the next value of the CPU BURST signal is inactive. Arbitrating devices on I/O bus 18 must request the bus using preempt before they can arbitrate and be granted the bus. If a device activates preempt during arbitration, it cannot fairly arbitrate for I/O bus 18 until the next arbitartion cycle occurs. Since the arbitration bus defaults to the CPU when no other devices are arbitrating, the CPU may unfairly be granted the bus. The CPU BURST signal provides an indication that the CPU fairly preempted for I/O bus 18 by activating the CPU PREEMPT signal during the previous grant cycle.

Other Embodiments

Other Embodiments are within the following claims.
What is claimed is:
1. An information handling system comprising
a processor,
a memory,
a bus,
   said bus electrically connectable to a controller device, said processor and said memory to allow information transfers via said bus between the controller device, said processor and said memory,
   the controller device and the processor being capable of controlling information transfers via said bus, and
means for selectively generating an arbitration hold signal, said arbitration hold signal indicating not to reallocate said bus,
a central arbiter,
   said central arbiter controlling allocation of said bus such that one of the controller device and the processor become a present controller device, the present controller device controlling a present information transfer via said bus,
   said central arbiter receiving said arbitration hold signal indicating to said arbiter that the present information transfer is occurring and not to reallocate said bus,
   said central arbiter using said arbitration hold signal to allow the controller device and said processor to arbitrate for said bus while the present information transfer is occurring, said central arbiter granting access to said bus when said arbitration hold signal indicates that said central arbiter can reallocate said bus as needed.

2. The apparatus of claim 1 wherein
said central arbiter includes a central arbiter state machine for receiving said arbitration hold signal and controlling reallocation of said bus.

3. The apparatus of claim 2 wherein
said central arbiter state machine includes a masked arbitration portion, an unmasked arbitration portion and a grant portion,
said masked arbitration portion includes a masked arbitration idle state and said unmasked arbitration portion includes an unmasked arbitration idle state, and
said arbitration hold signal forcing said central arbiter state machine to one of said masked arbitration idle state and said unmasked arbitration idle state when receiving an active arbitration hold signal and said present controller device releases said bus.

4. The apparatus of claim 3 wherein
said masked arbitration portion includes a masked refresh state,
said masked refresh state controlling a masked refresh function for said memory, and
upon completing said masked refresh function, said masked refresh state transitioning to said masked idle state when said arbitration hold signal is active.

5. The apparatus of claim 4 wherein
said unmasked arbitration portion includes an unmasked refresh state,
said unmasked refresh state controlling an unmasked refresh function for said memory, and
upon completing said unmasked refresh function said unmasked refresh state transitioning to said masked idle state when said arbitration hold signal is active.

6. The apparatus of claim 4 wherein
said grant portion includes a bus grant state, said bus grant state allowing said present controller device to transfer information via said bus, and upon said bus grant state relinquishing ownership of said bus, said grant state transitioning to one of said masked idle state and said unmasked idle state when said arbitration hold signal is active.

7. The apparatus of claim 4 further comprising:

a direct memory access (DMA) controller for controlling DMA transfer and wherein said grant portion includes a direct memory access grant state, said direct memory access grant state granting said direct memory access controller ownership of said bus to transfer information via said bus, and said unmasked arbitration portion includes a DMA arbitration state, said DMA arbitration state allowing said DMA controller to complete a DMA transfer while allowing arbitration to occur, and upon entering said DMA arbitration state, arbitration is locked until said arbitration hold signal goes inactive.

8. The apparatus of claim 2 wherein said central arbiter state machine includes an idle state, said arbitration hold signal forcing said central arbiter state machine to said idle state when receiving an active arbitration hold signal, and said idle state using said arbitration hold signal to allow the controller device and said processor to arbitrate for said bus while information from said present controller device is still transferring via said bus.

9. The apparatus of claim 8 wherein said central arbiter state machine remains in said idle state until said arbitration hold signal goes inactive.

10. The apparatus of claim 8 wherein said central arbiter state machine includes an arbitration portion and a grant portion, and said arbitration portion includes said idle state.

11. The apparatus of claim 10 wherein said arbitration portion includes a refresh state, said fresh state controlling a refresh function for said memory, and upon completing said refresh function, said refresh state transitioning to said idle state when said arbitration hold signal is active.

12. The apparatus of claim 10 wherein said grant portion includes a bus grant state, said bus grant state allowing said controller device to transfer information via said bus, and upon said bus grant state relinquishing ownership of said bus, said grant state transitioning to said idle state when said arbitration hold signal is active.

13. The apparatus of claim 10 further comprising:

a direct memory access controller for controlling direct memory access transfers and wherein said grant portion includes a direct memory access grant state, said direct memory access grant state granting said direct memory access controller ownership of said bus to transfer information via said bus, and said arbitration portion includes a DMA arbitration state, said DMA arbitration state allowing said DMA controller to complete a DMA transfer while allowing arbitration to occur, and upon entering said DMA arbitration state, arbitration is locked until said arbitration hold signal goes inactive.

14. An apparatus for controlling allocation of a bus in an information handling system, the information handling system including a processor, a memory, and the bus, the bus electrically connecting the processor and the memory to allow information transfers between the processor and the memory, the bus being electrically connectable to a controller device to allow the controller device to transfer information via the bus, the controller device and the processor being capable of controlling transfers of information via the bus, the apparatus comprising:

a central arbiter, said central arbiter controlling allocation of the bus such that one of the controller device and the processor become a present controller device, the present controller device controlling a present information transfer via the bus, and said central arbiter receiving an arbitration hold signal indicating to said arbiter not to reallocate said bus, said arbitration hold signal being selectively provided by a means for generating said arbitration hold signal, said arbiter using said arbitration hold signal to allow the controller device and the processor to arbitrate for the bus while the present information transfer is occurring, said arbiter granting access to said bus when said hold signal indicates that central arbiter can reallocate said bus.

15. The apparatus of claim 14 wherein said central arbiter includes a central arbiter state machine for receiving said arbitration hold signal and controlling reallocation of the bus.

16. The apparatus of claim 15 wherein said central arbiter state machine includes a masked arbitration portion, an unmasked arbitration portion and a grant portion, said masked arbitration portion includes a masked arbitration idle state and said unmasked arbitration portion includes an unmasked arbitration idle state, and said arbitration hold signal forcing said central arbiter state machine to said one of said masked arbitration idle state and said unmasked arbitration idle state when receiving an active arbitration hold signal and said present controller device releasing said bus.

17. The apparatus of claim 16 wherein said masked arbitration portion includes a masked refresh state, said masked refresh state controlling a masked refresh function for said memory, and upon completing said masked refresh function, said masked refresh state transitioning to said masked idle state when said arbitration hold signal is active.

18. The apparatus of claim 17 wherein said unmasked arbitration portion includes an unmasked refresh state, said unmasked refresh state controlling an unmasked refresh function for said memory, and upon completing said unmasked refresh function, said unmasked refresh state transitioning to said masked idle state when said arbitration hold signal is active.

19. The apparatus of claim 16 wherein said grant portion includes a bus grant state, said bus grant state allowing said present controller device to transfer information via said bus, and upon said bus grant state relinquishing ownership of said bus, said grant state transitioning to one of said masked idle state and said unmasked idle state when said arbitration hold signal is active.

20. The apparatus of claim 16 wherein the information handling system further includes a direct memory access (DMA) controller for controlling DMA transfers, and said grant portion includes a direct memory access grant state, said direct memory access grant state granting said direct memory access controller ownership of said bus to transfer information via said bus, and said unmasked arbitration portion includes a DMA arbitration state, said DMA arbitration state allowing said DMA controller to complete a DMA transfer while allowing arbitration to occur, and upon entering said DMA arbitration state, arbitration is locked until said arbitration hold signal goes inactive.

21. The apparatus of claim 15 wherein said central arbiter state machine includes an idle state, said arbitration hold signal forcing said central arbiter state machine to said idle state when receiving an active arbitration hold signal, and said idle state using said arbitration hold signal to allow the controller device and said processor to arbitrate for said bus while information from said present controller device is still transferring via said bus.

22. The apparatus of claim 21 wherein said central arbiter state machine remains in said idle state until said arbitration hold signal goes inactive.

23. The apparatus of claim 21 wherein said central arbiter state machine includes an arbitration portion and a grant portion, and said arbitration portion includes said idle state.

24. The apparatus of claim 23 wherein said arbitration portion includes a refresh state, said refresh state controlling a refresh function for said memory, and upon completing said refresh function, said refresh state transitioning to said idle state when said arbitration hold signal is active.

25. The apparatus of claim 23 wherein said grant portion includes a bus grant state, said bus grant state allowing said controller device to transfer information via said bus, and upon said bus grant state relinquishing ownership of said bus, said grant state transitioning to said idle state when said arbitration hold signal is active.

26. The apparatus of claim 23 further comprising:

a direct memory access controller for controlling direct memory access transfers and wherein said grant portion includes a direct memory access grant state, said direct memory access grant state granting said direct memory access controller ownership of said bus to transfer information via said bus, and said arbitration portion includes a DMA arbitration state, said DMA arbitration state allowing said DMA controller to complete a DMA transfer while allowing arbitration to occur, and upon entering said DMA arbitration state, arbitration is locked until said arbitration hold signal goes inactive.

* * * * *